US012592130B2

(12) United States Patent
Jones et al.

(10) Patent No.: US 12,592,130 B2
(45) Date of Patent: Mar. 31, 2026

(54) GAMING SYSTEMS AND METHODS USING MULTI-FEATURE AWARD ACCUMULATION

(71) Applicant: LNW Gaming, Inc., Las Vegas, NV (US)

(72) Inventors: Colbee V. Jones, Reno, NV (US); Dougal Austin, Reno, NV (US); Kellen Dale, Reno, NV (US); Amy Robards, Sparks, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 280 days.

(21) Appl. No.: 18/314,949

(22) Filed: May 10, 2023

(65) Prior Publication Data

US 2024/0378966 A1 Nov. 14, 2024

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC .......................... G07F 17/3267; G07F 17/3213
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
5,431,408 A 7/1995 Adams
5,511,781 A 4/1996 Wood et al.
5,618,232 A 4/1997 Martin
5,695,188 A 12/1997 Shibashi
5,704,835 A 1/1998 Dietz
5,722,891 A 3/1998 Inoue
5,752,881 A 5/1998 Inoue
5,766,074 A 6/1998 Cannon et al.
(Continued)

FOREIGN PATENT DOCUMENTS

AU 2013251288 A1 5/2014
AU 2014202042 A1 5/2014
(Continued)

*Primary Examiner* — Jeffrey K Wong

(57) ABSTRACT

There are provided a gaming machine and method that utilize game-logic circuitry and a presentation assembly configured to present a base game and a feature game including a plurality of persistent elements. In response to a base game outcome including a value-bearing symbol associated with a persistent element, award indicia of the persistent element is updated as a function of the value-bearing symbol. The feature game is triggered in response to a feature-triggering symbol in the base game outcome. During the feature game, in response to an award trigger, an award sequence is presented for an award indicated by the award indicia of the persistent element.

21 Claims, 14 Drawing Sheets

(56) References Cited

U.S. PATENT DOCUMENTS 5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes, Jr. et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,004,207 A 12/1999 Wilson, Jr. et al.
6,027,115 A 2/2000 Griswold et al.
6,033,307 A 3/2000 Vancura
6,048,269 A 4/2000 Bums et al.
6,050,895 A 4/2000 Luciano, Jr. et al.
6,056,642 A 5/2000 Bennett
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 2/2001 Mayeroff
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,346,043 B1 2/2002 Colin et al.
6,364,766 B1 4/2002 Anderson et al.
6,375,567 B1 4/2002 Acres
6,375,570 B1 4/2002 Poole
6,378,042 B1 * 4/2002 Henderson .......... G06F 12/0802
711/134
6,413,162 B1 7/2002 Baerlocher et al.
6,481,713 B2 11/2002 Perrie et al.
6,517,432 B1 2/2003 Jaffe
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,561,904 B2 5/2003 Locke et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Laughlin
6,692,356 B2 2/2004 Baerlocher et al.
6,702,675 B2 3/2004 Poole et al.
6,731,313 B1 5/2004 Kaminkow
6,749,502 B2 6/2004 Baerlocher
6,786,818 B1 9/2004 Rothschild et al.
6,832,957 B2 12/2004 Falconer
6,837,790 B1 1/2005 Kaminkow
6,855,053 B2 2/2005 Baerlocher
6,869,360 B2 3/2005 Marks et al.
6,878,061 B2 4/2005 Baerlocher et al.
6,896,617 B2 5/2005 Daly
6,910,962 B2 6/2005 Marks et al.
6,916,243 B2 7/2005 Yoshida
6,918,834 B2 7/2005 Vancura
6,921,334 B1 7/2005 Bennett
6,926,609 B2 8/2005 Martin
6,960,134 B2 11/2005 Hartl et al.
6,964,416 B2 11/2005 Mcclintic et al.
7,018,293 B2 3/2006 Brown et al.
7,029,395 B1 4/2006 Baerlocher
7,029,396 B2 4/2006 Jaffe et al.
7,065,215 B2 6/2006 Shirakawa et al.
7,112,136 B2 9/2006 Anderson et al.
7,121,945 B2 10/2006 Suganuma et al.
7,137,886 B2 11/2006 Locke et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,294,055 B2 11/2007 Baerlocher et al.
7,316,613 B2 1/2008 Luccesi et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Loose et al.
7,488,252 B2 2/2009 Griswold et al.
7,494,412 B2 2/2009 Baerlocher
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,618,319 B2 11/2009 Casey et al.
7,625,278 B2 12/2009 Paulsen et al.
7,628,690 B2 12/2009 Englman et al.
7,631,872 B2 12/2009 Roemer et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,744,460 B2 6/2010 Walker et al.
7,785,191 B2 8/2010 Marks et al.
7,789,744 B2 9/2010 Fiden
7,841,934 B2 11/2010 Gauselmann
7,980,936 B2 7/2011 Mead
8,021,223 B2 9/2011 Rose
8,021,225 B2 9/2011 Okada
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,147,322 B2 4/2012 Walker et al.
8,162,740 B2 4/2012 Aoki
8,162,741 B2 4/2012 Wadleigh et al.
8,192,275 B2 6/2012 Aoki et al.
8,246,442 B1 8/2012 Barrie
8,272,938 B2 9/2012 Gilmore et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,465,358 B2 6/2013 Kemper
8,480,473 B2 7/2013 Villejo et al.
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,678,908 B2 3/2014 Nicely

(56) References Cited

U.S. PATENT DOCUMENTS 8,690,660 B2 4/2014 Saunders et al.
8,696,434 B2 4/2014 Tsukahara
8,702,487 B2 4/2014 Thomas
8,771,054 B2 7/2014 Aoki et al.
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0009865 A1* 7/2001 Demar .................... G07F 17/32
463/20
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0050111 A1* 3/2003 Saffari ................ G07F 17/3255
463/25
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0038733 A1* 2/2004 Walker ................ G07F 17/3244
463/25
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0147300 A1* 7/2004 Seelig ..................... G07F 17/34
463/16
2004/0171417 A1 9/2004 Beaulieu et al.
2004/0172508 A1* 9/2004 Nguyen .............. G06F 11/1666
711/162
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0057464 A1* 3/2007 Cockrell, Jr. ............. A63F 1/00
273/303
2007/0060248 A1 3/2007 Rodgers et al.
2007/0060255 A1 3/2007 Baerlocher et al.
2007/0060275 A1 3/2007 Gilmore et al.
2007/0099695 A1* 5/2007 Wilson .................... G07F 17/34
463/25
2007/0117603 A1* 5/2007 Seelig ................. G07F 17/3211
463/16
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0146346 A1* 6/2008 Hardy ................... G07F 17/329
463/16
2008/0182647 A1 7/2008 Brunet De Courssou et al.
2008/0242421 A1* 10/2008 Geisner ................... A63F 13/75
463/42
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0300937 A1 12/2011 Crowder, Jr. et al.
2012/0015707 A1 1/2012 Hornik et al.
2012/0034965 A1 2/2012 Masen et al.
2012/0064961 A1* 3/2012 Vancura ............. G07F 17/3265
463/20
2012/0077564 A1 3/2012 Collette et al.

(56) References Cited

U.S. PATENT DOCUMENTS

| | | | |
|---|---|---|---|
| 2012/0094738 A1 | 4/2012 | Aoki et al. | |
| 2012/0122532 A1 | 5/2012 | Berman et al. | |
| 2012/0178517 A1 | 7/2012 | Montenegro et al. | |
| 2012/0220360 A1 | 8/2012 | Mcallister et al. | |
| 2013/0053124 A1 | 2/2013 | Masen et al. | |
| 2013/0065663 A1 | 3/2013 | Johnson et al. | |
| 2013/0102375 A1 | 4/2013 | Aoki et al. | |
| 2013/0252704 A1 | 9/2013 | Gilbertson et al. | |
| 2013/0260861 A1 | 10/2013 | Vann et al. | |
| 2013/0324217 A1 | 12/2013 | Gilbertson et al. | |
| 2014/0014186 A1 | 1/2014 | Bhattacharya et al. | |
| 2014/0024429 A1 | 1/2014 | Aoki et al. | |
| 2014/0051496 A1 | 2/2014 | Meyer | |
| 2014/0114890 A1* | 4/2014 | Fujimaki | G06N 20/00 706/12 |
| 2014/0141860 A1 | 5/2014 | Meyer | |
| 2014/0179396 A1 | 6/2014 | Aoki et al. | |
| 2014/0274292 A1 | 9/2014 | Suda | |
| 2014/0323198 A1 | 10/2014 | Tuck | |
| 2015/0031437 A1 | 1/2015 | Gomez et al. | |
| 2015/0170462 A1 | 6/2015 | Berman et al. | |
| 2015/0206386 A1 | 7/2015 | Jaffe et al. | |
| 2015/0269809 A1 | 9/2015 | Smith | |
| 2015/0287269 A1 | 10/2015 | Berman | |
| 2015/0356833 A1 | 12/2015 | Aoki et al. | |
| 2015/0379831 A1 | 12/2015 | Lee et al. | |
| 2016/0042597 A1 | 2/2016 | Olive | |
| 2016/0155303 A1 | 6/2016 | Aoki et al. | |
| 2016/0358424 A1* | 12/2016 | Thomas | G07F 17/3272 |
| 2017/0154498 A1 | 6/2017 | Olive | |
| 2017/0372558 A1 | 12/2017 | You et al. | |
| 2018/0130285 A1* | 5/2018 | Ang | G07F 17/3244 |
| 2018/0130303 A1 | 5/2018 | Lamb | |
| 2018/0268655 A1 | 9/2018 | Olive | |
| 2018/0268659 A1 | 9/2018 | Chesworth et al. | |
| 2019/0051097 A1 | 2/2019 | Marks et al. | |
| 2019/0102992 A1 | 4/2019 | You et al. | |
| 2019/0236905 A1 | 8/2019 | Washington et al. | |
| 2024/0242571 A1* | 7/2024 | Dale | G07F 17/3258 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

GAMING SYSTEMS AND METHODS USING MULTI-FEATURE AWARD ACCUMULATION

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to technological improvements in connection with a value-accumulation feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to embodiments of the present invention, there are provided a gaming machine and method that utilize game-logic circuitry and a presentation assembly configured to present a plurality of symbol-bearing base reels, a base array, and a plurality of persistent elements. The plurality of base reels are spun and stopped to land symbols from the base reels in the base array. In response to the landed symbols including a value-bearing symbol associated with a first persistent element, the game-logic circuitry accumulates, for the first persistent element, the value-bearing symbol by updating, via the presentation assembly, the award indicia of the first persistent element at least partially as a function of an award value visually indicated by the value-bearing symbol. In response to the landed symbols including at least one feature-triggering symbol associated with the first persistent element, an animation of an addition of the feature-triggering symbol to the first persistent element is presented, and a random determination whether or not to trigger one or more game features associated with the first persistent element is made. In response to triggering the one or more game features, the one or more game features are implemented, including: presenting, via the presentation assembly, a plurality of symbol-bearing bonus reels, a bonus array, and the first persistent element, causing the presentation assembly to spin and stop the plurality of bonus reels to land symbols from the bonus reels in the bonus array, and presenting, via the presentation assembly and in response to detecting the landed symbols in the bonus array includes an award trigger, an award sequence for the first persistent element to provide an accumulated award indicated by the award indicia of the first persistent element.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to a game feature that may be triggered during play of the base game.

Figure 1:
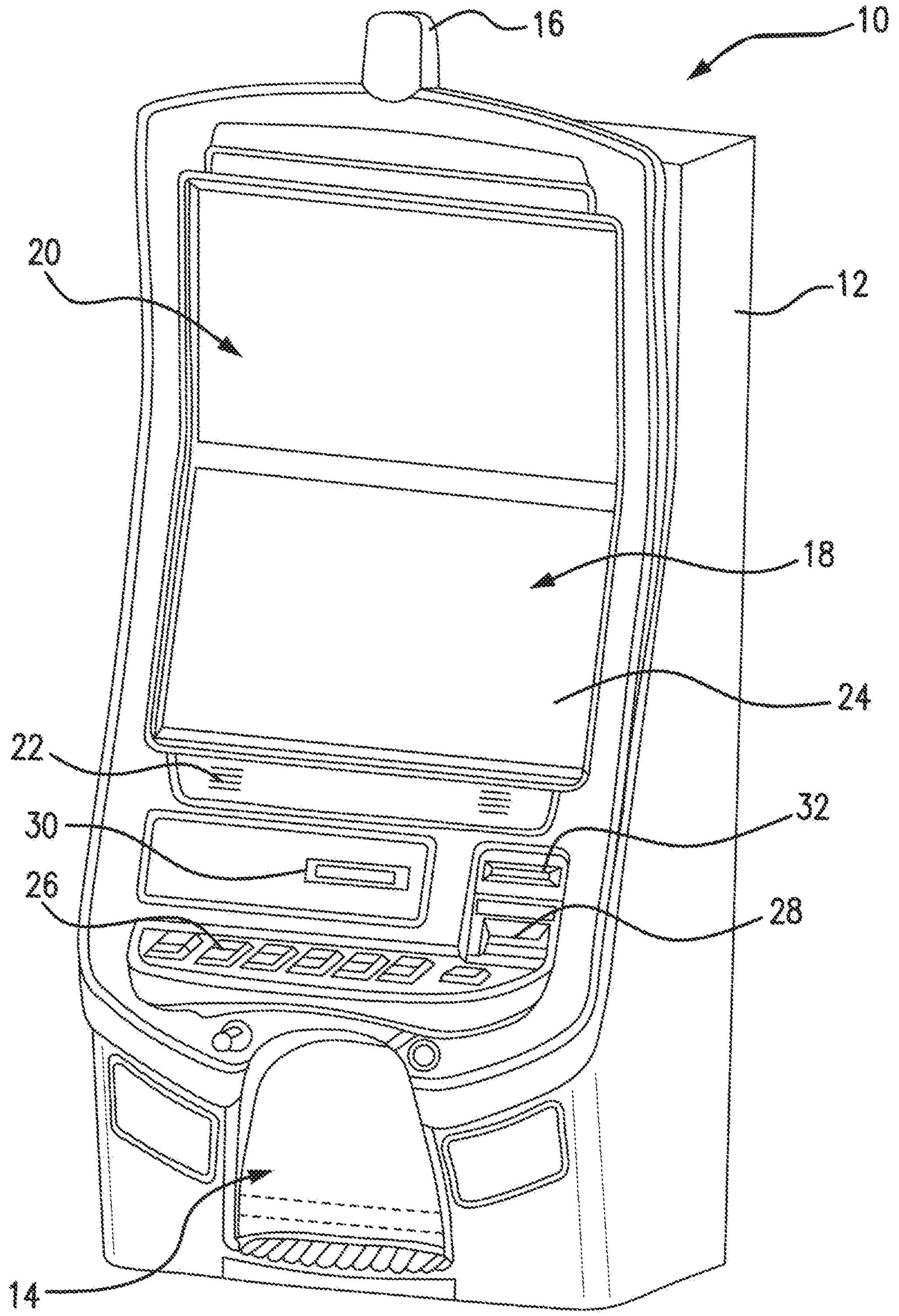
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
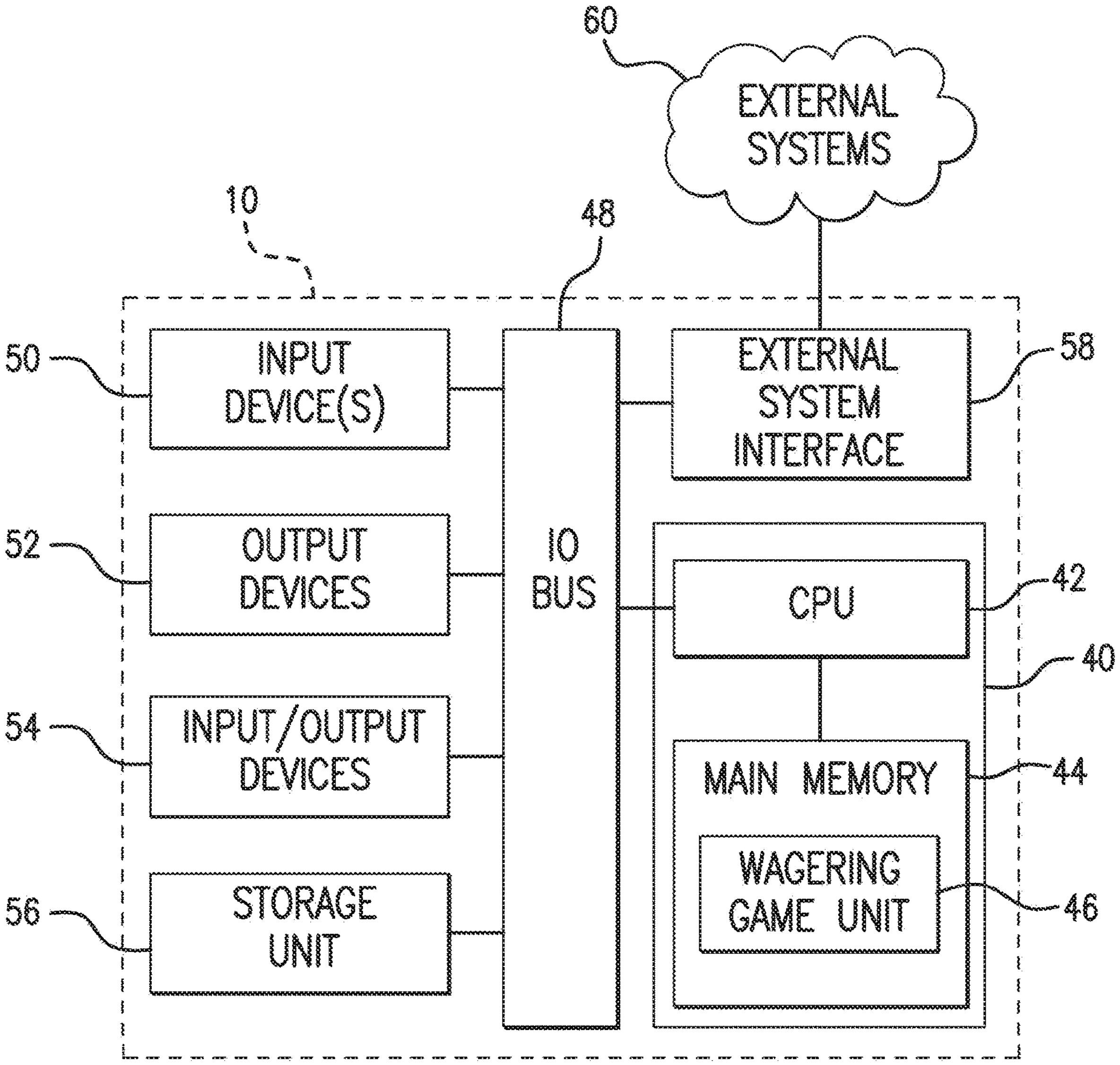
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
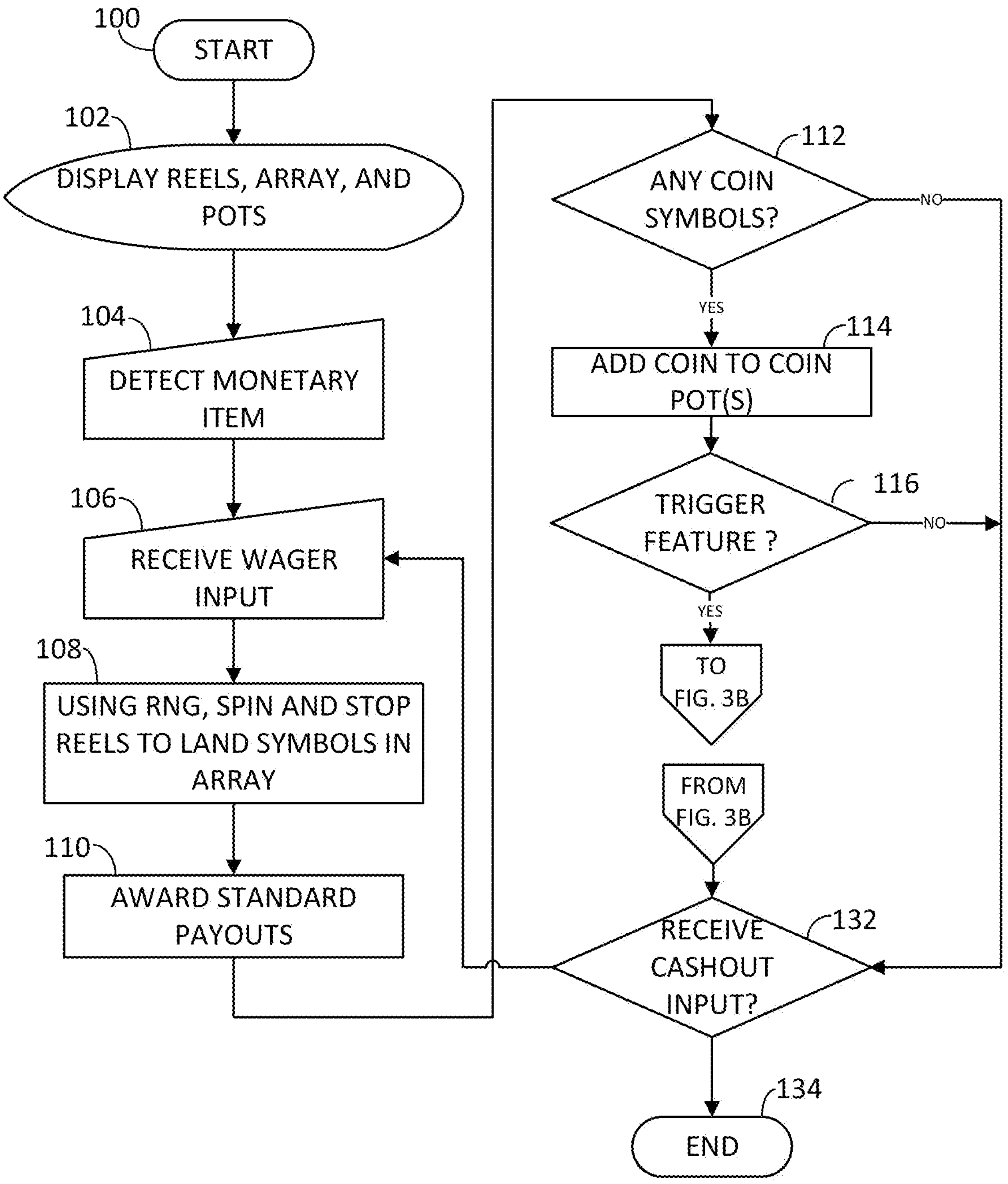
FIGS. 3A and 3B are a flow diagram for a data processing method that corresponds to instructions executed by a controller, according to an embodiment of the present invention.
Figure 3B:
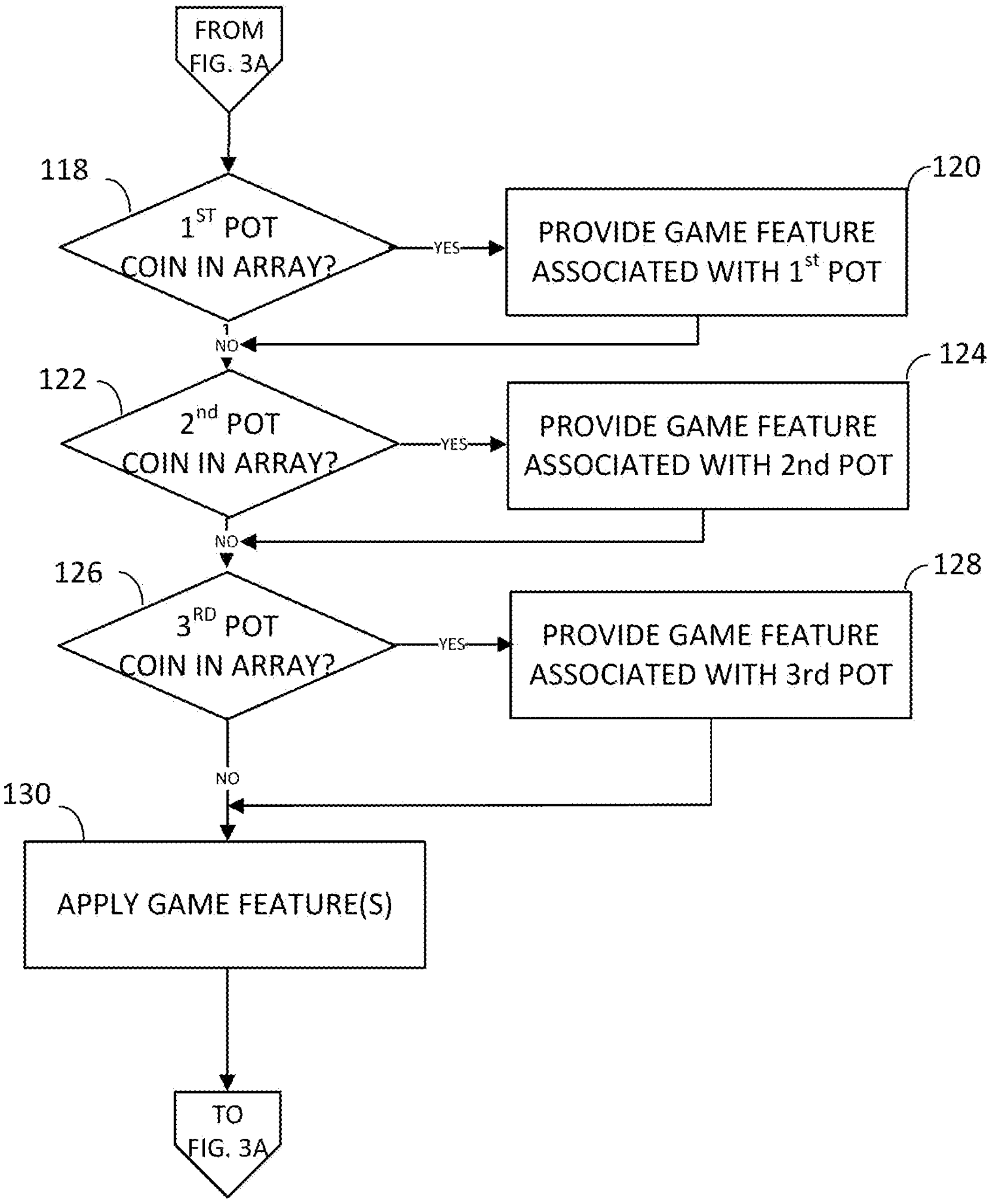

Referring now to FIGS. 3A-3B, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcome in FIG. 4.

Referring to FIG. 3A, the data processing method commences at step 100. At step 102, the game-logic circuitry controls one or more presentation devices (e.g., mechanical-reel display device, video display device, or a combination thereof) to present a plurality of symbol-bearing reels, an array of symbol positions, and a feature-triggering perceived persistent element (e.g., one or more coin pots). Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games and/or other game features utilizing the array.

Figure 4:
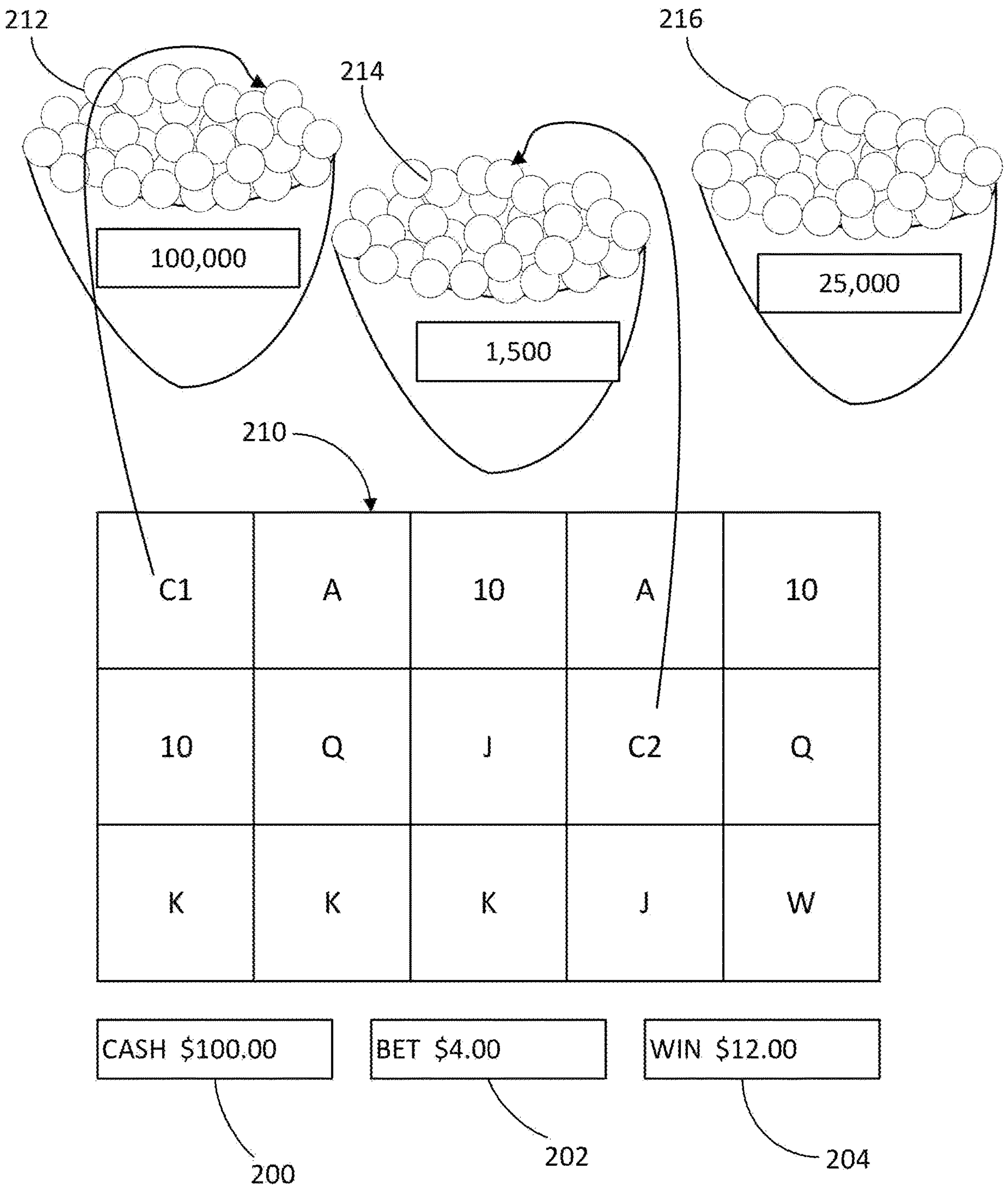
FIG. 4 is an exemplary presentation of a base-game spin outcome resulting from the flow diagram in FIG. 3A.

In FIG. 4, the symbol array 210 in the base game has a three-by-five rectangular configuration, and each symbol position is associated with a respective independent reel. The reels bear a plurality of symbols that may, for example, include royal symbols 10, J, Q, K, and A; a wild symbol W that can substitute for any of the royal symbols; and generic coin symbols C1, C2, C3.

In one or more embodiments, the plurality of symbols also includes value-bearing symbols, otherwise known as WYSIWYG ("What You See is What You Get") or "cash on reels" symbols. In certain embodiments, the coin symbols C1, C2, C3, in addition to the feature-triggering functions described herein, may be value-bearing symbols. Each value-bearing symbol is associated with a credit or currency value indicated on the symbol itself. The value on a particular credit-bearing symbol may be fixed or variable (e.g., random) from one game cycle to the next. Different value-bearing symbols on the reels may have different values. In one or more embodiments, a value-bearing symbol may be associated with a value determined or displayed separately. For example, rather than a specific amount, a GRAND, MAJOR, MINOR, or MINI award label may be indicated on a value-bearing symbol. Each reel may contain one or more stacks (i.e., clumps) of value-bearing symbols that appear adjacent to each other along the reel. The values of the value-bearing symbols in any given stack may be the same or different. A stack of value-bearing symbols may consist of two, three, four, or more adjacent symbols. Further, adjacent reels may contain one or more "mega" value-bearing symbols that move as one block as the reels spin. When the spin is complete, each individual row and column of the array underlying any visible portion of the "mega" symbol is assigned the value associated with the "mega" value-bearing symbol. For example, a "mega" value-bearing symbol may comprise two-row high square spanning the first two columns of the array 210. If this symbol stops aligned with the top two rows of the array 210, the symbols in the first two rows and first two columns would all be treated as though individual value-bearing symbols having the value of the "mega" symbol had landed in those locations.

At step 104, the game-logic circuitry detects, via a value input device, a physical item associated with a monetary value that establishes a monetary balance in the form of cash or credits. In FIG. 4, the monetary balance may be shown on a meter 200.

At step 106, the game-logic circuitry initiates a base game of a wagering game cycle (i.e., spin cycle) in response to an input indicative of a wager covered by the monetary balance. To initiate a spin of the reels, the player may press a "Spin" or "Max Bet" key on a button panel or touch screen. In FIG. 4 the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts a base-game spin outcome.

At step 110, the game-logic circuitry awards standard payouts in accordance with a pay table. The pay table may, for example, include "line pays." "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three K symbols in the bottom row of the array 210. The awarded pay is added to a win meter 204.

At step 112, the game-logic circuitry determines whether or not any coin symbols C1. C2 or C3 (sometimes referred to herein as "trigger symbols" or "feature-triggering symbols") landed in the array. If a coin symbol C1, C2 or C3 did not land in the array, the game-logic circuitry immediately proceeds to step 132 and/or performs other outcome determinations. If, however, one or more coin symbols C1, C2 or C3 landed in the array as shown in FIG. 4, the game-logic circuitry proceeds to step 114. At step 114, the game-logic circuitry animates the addition of each coin symbol C1, C2 or C3 to a persistent element such as a coin pot (FIG. 4; 212, 214, 216) associated with the respective coin symbol C1, C2 or C3. For example, the coin symbol C2 in the center column of FIG. 4 may be animated to "fly" off the array and land in the middle of its associated coin pot 212. To represent the addition of the coin symbol to the coin pot, the pot and/or the volume of coins therein may appear to grow in size. In FIG. 4, the transfer of the coin symbol C2 to the middle coin pot 214 is represented by an arrow. The persistent elements may take forms other than the coin pots 212, 214, 216, including for example urns, vases, jars, jugs, cans, bowls, piggy banks, beehives, inflating balloons, ladders, dials, meters, etc. In accordance with some embodiments, the persistent element may be an object of fixed size accompanied by some other indication of accumulating value, for example, by a gradual change in color. In other embodiments, the persistent element may change size and also show some other indication of increasing value, for example, the color of the display in the immediate area of the persistent element may gradually change as its value increases.

During a player's gaming session, the growth in size of the coin pots 212, 214 216 in FIG. 4 may persist from one wagering game cycle to the next such that the player perceives that the corresponding game feature may be getting closer to being triggered. This kind of game is known as a "perceived persistence" game. Unlike a true "persistence game," wherein the size of each coin pot or the observable quantity of its contents serves as an indication of the probability that its associated bonus or game feature will be triggered. In both cases, when the bonus or game feature associated with a pot is triggered, at least some of the contents of the pot are visually removed and the accumulation of coins in that pot during subsequent game spin cycles resumes from that point.

In at least some embodiments, the coin pots 212, 214, 216 include one form of persistence while providing a perceived persistence in other aspects. For example, the coin pots 212, 214, 216 may be configured to accumulate values from value-bearing symbols as described herein and provide a visual indication of the accumulated value (e.g., via award indicia present on the coin points 212, 214, and 216), while the visual size of the pots 212, 214, 216, and/or the number of coins populating the pots changes without adjusting the underlying parameters affecting the trigger determination for the corresponding game feature. That is, the random determination to trigger a game feature associated with a coin pot in response to a trigger event remains the same irrespective of the visual state of the coin pot.

In the perceived persistence embodiments described here, at step 116, if at least one coin symbol C1, C2, or C3 appears in the array, the game-logic circuitry randomly determines, via the RNG, whether or not to trigger one or more game features of varying types, described below. This random determination is independent of any prior wagering game cycles.

In some embodiments, a game feature simply awards a prize, for example a fixed or progressive jackpot amount.

In some embodiments, a game feature may comprise any type of bonus game. The term "bonus game" as used herein refers to a game feature that functions through additional, fewer, or alternative game logic and/or game elements relative to the base game feature. Non-limiting examples of bonus games include a certain number of free games (i.e., spins of the reels), a "pick' em" bonus game, a wheel-spinning game, etc. In embodiments offering a free spin bonus game, the free spins may be played as a "hold and spin" game in which certain types of symbols, once landed in the array, are held in place and persist in the array for at least one additional free spin cycle. These persistent symbols may include value-bearing ("WYSIWYG") symbols, wild symbols or other symbols that may improve the chances of winning or provide higher pays. In still other embodiments, a bonus game may be played to determine a game enhancement (described further below) or payment of prize, for example, a fixed or progressive jackpot (described above). The game enhancement may be applied to an outcome of the bonus game, the current base game or one or more future play cycles of the same bonus game, a different bonus game or the base game.

In some embodiments, a game feature may comprise an enhancement to the game. An enhancement may include, without limitation, pay table modifiers such as multipliers, increased values on value-bearing symbols, modification to the reels to include improved symbols, such as wild symbols or symbol weights or the removal of certain "blocking symbols", additional rows or columns added to the array, additional free spins, replacement symbols for symbols already present in the array, etc. The enhancement may be applied to the current base game outcome or may be applied to one or more subsequent game features or wagered base game plays.

In at least some embodiments, the game feature incorporates one or more awards indicated by award indicia for the persistent elements. That is, during the triggered game feature, the awards indicated by the award indicia may be awarded, modified, and/or otherwise incorporated into play of the game feature. In one example, the triggered game feature includes one or more award trigger events that, when detected, provide the award indicated by the award indicia of a persistent element. In another example, the award trigger event is present in both the base game feature and the triggered game feature, but the triggered game feature includes modifier events and/or conditions that enhance the award. In a further example, the accumulated value indicated by the indicia may not directly be used to provide an award, but rather the value is compared to one or more threshold values. Based on the comparison, one or more game events may be triggered (e.g., bonus symbols awarded) and/or a state of the game feature may be changed.

If a game feature is not triggered at step 116, the spin cycle is complete, and the game-logic circuitry proceeds to step 132. If, however, a game feature was triggered at step 116, the game-logic circuitry instead proceeds to the flow in FIG. 3B to determine which of one or more game features have been won according to the specific coin C1, C2 and C3 present in the array.

At step 118 in FIG. 3B, the game logic circuitry determines if a coin C1 associated with the left pot 212 is present in the array. If not, the method proceeds to step 122, otherwise, a game feature associated with the left pot 212 is enabled at step 120.

At step 122, the game logic circuitry determines if a coin C2 associated with the middle pot 214 is present in the array. If not, the method proceeds to step 126, otherwise, a game feature associated with the middle pot 214 is enabled at step 124.

At step 126, the game logic circuitry determines if a coin C3 associated with the right pot 216 is present in the array. If not, the method proceeds to step 130, otherwise, a game feature associated with the middle pot 214 is enabled at step 128.

Specific examples of game features are provided herein according to the embodiments of the present disclosure.

Depending on which coins C1, C2 and C3 are present in the array, it is possible for more than one of the above-described game features to be applied to the game. For example, the left pot 212 may award a pay table multiplier as its associated game feature and the middle pot 214 may simultaneously award a game feature of extra free spins as its associated game feature. In this example, when the enhanced game feature spin cycles are played, both enhancements will be in effect. That is, each enhanced game feature spin cycle will benefit from the pay table multiplier.

In at least some embodiments described herein, the game feature for each coin pot is similar and associated with a corresponding award value indicating by award indicia of the coin pot. That is, as described herein, the coin pots are configured to accumulate award values presented by value-bearing symbols through one or more game features and, in response to an award trigger event occurring with the triggered bonus game feature, the accumulated value of the coin pot is provided to the credit balance within an award sequence. In certain embodiments, the award trigger event includes an award trigger symbol populating the symbol array. In some embodiments, the coin pots include additional or alternative game functions and/or indicia. In one example, one or more of the coin pots may be associated with a modifier and/or type of game feature, which may be triggered in response to the interactions described herein (e.g., accumulating or awarding award values). In such an example, the modifier may be applied or selectively applied to award values accumulated by the coin pot and/or the aggregate value indicated by the award indicia of the coin pot.

Each game feature has a different impact on the expected value (EV) of the game. The relative frequency of the game features may be controlled by adjusting how frequently the associated coins C1, C2 and C3 appear in the array, for example, by their relative weighted appearances on the reels. Thus, a less lucrative game feature may be won more frequently, for example, approximately once in every ten game spin cycles, while a higher paying game feature may only occur approximately once in every one hundred game spin cycles. This allows game features to be triggered more often, for player enjoyment, while maintaining the overall expected EV of the wagering game.

To present a game feature and any enhancements enabled in steps 118-128, at step 130 the game-logic circuitry may control one or more presentation devices (e.g., mechanical-reel display device, video display device, or a combination thereof) to present a game interface associated with the triggered game feature. For example, the presentation assembly may present a game interface with a bonus game array. The bonus game array may have the same configuration as the base game array or may have a different configuration than the base game array. Additional or alternative game and/or presentation elements may be presented for the triggered game feature to enable certain aspects of the game, visually distinguish from the base game feature, and/or otherwise facilitate the game feature. In one example, one or more persistent elements are visually changed to indicate whether the persistent element is active, inactive, and/or other suitable states within the triggered game feature. The presentation assembly, in combination with the logic circuitry, is configured to conduct the triggered game feature according to the embodiments described herein.

The triggered game feature may have a limited duration and/or is at least partially incorporated into the base game feature. The logic circuitry is configured to monitor the remaining duration of the game feature, the credit balance, player input, and/or other suitable parameters to determine the state of the gaming session. For example, in response to the triggered game feature having no remaining duration, the logic circuitry may automatically return to the base game feature.

Referring back to FIG. 3A, at step 132, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIG. 4. The data processing method then ends at step 134.

Figure 5:
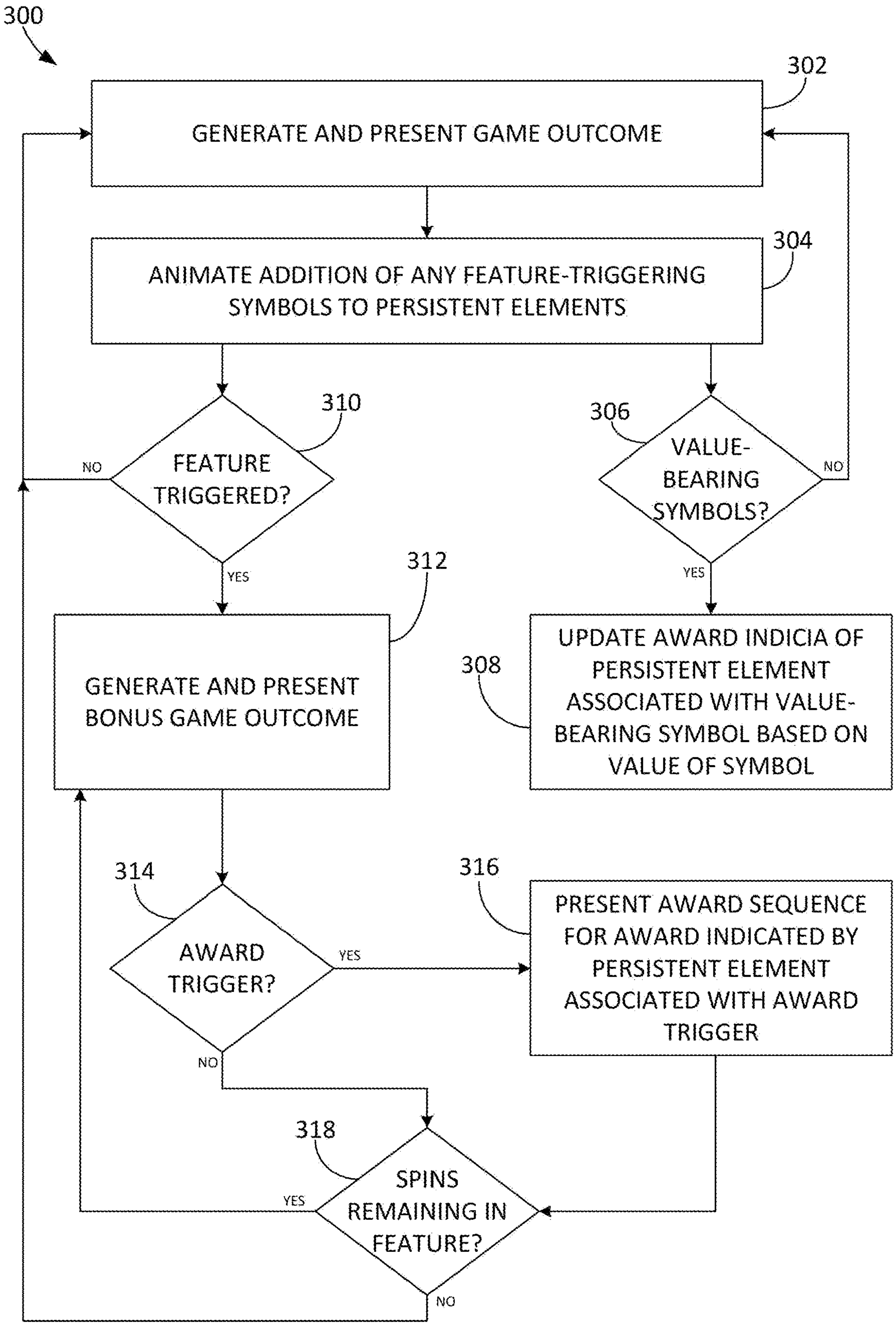
FIG. 5 is an exemplary flow diagram of a method for conducting a game feature with award value accumulation.

FIG. 5 is a flow diagram of an example method 300 for conducting a game including one or more persistent elements using a gaming system (e.g., the system shown in FIGS. 1 and 2) according to one or more embodiments. The method 300 is at least partially performed using game-logic circuitry of the gaming system in communication with one or more presentation assemblies of a gaming machine. The game-logic circuitry may be independent of the gaming machine, partially integrated with the gaming machine, or fully integrated with the gaming machine. In other embodiments, the method 300 includes additional, fewer, or alternative steps and/or performed by a different configuration of devices, including those steps and devices described elsewhere herein.

At step 302, the game-logic circuitry is configured to generate a game outcome for a base game feature of the game. In at least some embodiments, the game is an array-based game, where symbol positions of the array are populated with randomly selected symbols to form the game outcome. The random selection may be fully or partially random and/or incorporate weighting parameters that influence the probability of selecting a certain symbol or, for reel-based features, reel stop positions. In one example, the available symbols are stored by the game-logic circuitry in one or more weighted tables, where one or more random values are compared to the weighted tables to select the symbols for the game outcome. The game-logic circuitry is configured to cause the presentation assembly of the gaming machine to present the game outcome to a player through a game interface and corresponding presentation elements and/or animations. For example, the game outcome presentation may include an animation of one or more symbol-bearing reel strips spinning and stopping on the symbol or symbols that form the game outcome.

In addition to the symbol array, in the example embodiment, the game interface includes one or more persistent elements. At least one of the persistent elements includes indicia to visually indicate a corresponding game feature and/or award as described herein. The persistent elements are configured to have a dynamic or variable presentation that is modified in response to certain game events or conditions as described herein. In the example embodiment, each of the persistent elements are associated with one or more symbols within the set or sets of available symbols, and the following steps are associated with the detection of these symbols.

The generation and presentation of the game outcome includes the game-logic circuitry performing one or more outcome determinations. The outcome determinations compare the symbols of the game outcome (and/or other suitable game elements of the outcome) to one or more predefined rules or game logic stored by the game-logic circuitry. Based on the comparison, the game-logic circuitry is configured to automatically perform one or more actions associated with the game and/or cause the presentation assembly to perform a corresponding presentation sequence. For example, if the game-logic circuitry determines a winning combination of symbols is present in the array, the game-logic circuitry is configured to provide a corresponding award to the player and cause the presentation assembly to present an award sequence for the award. For embodiments with multiple outcome determinations, the determinations may be performed at least partially in parallel or sequentially to each other and/or other processes associated with the logic circuitry.

Outcome determinations may result in corresponding presentation sequences. For example, in response to a winning combination of symbols, an award sequence is presented by the presentation assembly for an award associated with the winning combination. The presentation sequences may be at least partially blended together and/or with other suitable presentations of the game interface. Some outcome determinations and corresponding presentation sequences are described herein, such as those associated with steps 304-312.

In the example embodiment, the outcome determinations include the detection of any feature-triggering symbols within the game outcome. A feature-triggering symbol is associated with one or more of the persistent elements and a corresponding trigger event. The trigger event is used to selectively activate a bonus game feature as described herein. In the example embodiment, the trigger event includes detecting one or more feature-triggering symbols within the game outcome. In other embodiments, additional or alternative game events or game conditions may be included in the trigger event. In one example, the trigger event includes detecting a feature-triggering symbol within a winning combination of symbols.

The feature-triggering symbols may include a visual appearance that readily indicates the associated persistent element or elements. For example, the feature-triggering symbols and associated persistent elements may have the same or complementary colors, shape, theme, indicia, and the like. The feature-triggering symbols may include any additional or alternative functionality within the game beyond those functions described herein. For example, the feature-triggering symbols may function as wild symbols for determining winning symbol combinations.

In the example embodiment, at step 304, the presentation assembly is configured to animate the addition of any feature-triggering symbols detected within the game outcome to the corresponding one or more persistent elements. The animation may include, for example, the feature-triggering symbols flying towards the associated persistent element. In other embodiments, the animation does not necessarily visually combine the feature-triggering symbol and the persistent element, but rather indicates the link or relationship between the game elements. For example, if the persistent element is visually presented as a pot of gold, the feature-triggering symbol may cause an additional piece or pieces of gold to be added to the pot of gold. As set forth above, in the example embodiment, the visual changes to the persistent element do not impact the underlying determination for triggering a corresponding feature as described herein. That is, the changes to visual appearance of the persistent element are perceived persistence. In other embodiments, the visual changes to the persistent element based on the number, value, and/or frequency of feature-trigger symbols detected in one or more game outcomes, may affect the underlying game determinations associated with the persistent element as described herein.

In the example embodiment, the logic circuitry is configured to perform at least two outcome determinations at steps 306 and 310 in response to the detection of one or more feature-triggering symbols. In other embodiments, these outcome determinations may be independent of feature-triggering symbols and/or occur separately from step 304. That is, although steps 306 and 310 are shown to be performed following step 304, these steps may be performed prior to, during (i.e., in parallel), partially overlapping, after, and/or independently of step 304. In one example, the outcome determinations at steps 306 and 310 are processed within or immediately following the generation of the game outcome at step 302, and any corresponding animations and other updates to the game interface are queued for presentation in a manner readily understood by the player (e.g., steps 308 and 312 as described herein).

In the example embodiment, at step 306, the logic circuitry determines whether or not the symbol array of the game outcome includes any value-bearing symbols. Value-bearing symbols include award indicia visually indicating a respective award value associated with each value-bearing symbol. If the game outcome includes both one or more feature-triggering symbols and one or more value-bearing symbols, a value-accumulation event is triggered for the persistent element or elements associated with the feature-triggering symbols of the game outcome. In other embodiments, the trigger for the value-accumulation event is independent of the feature-triggering symbols, and instead is dependent upon the value-bearing symbols, other symbols, certain symbol combinations or positioning, other game elements, player input, and/or random determinations. In one example, for each value-bearing symbol, one or more random determinations is performed by the logic circuitry to determine whether or not to initiate a value-accumulation event and/or which persistent element is associated with the event. In such embodiments, the determination at step 306 is independent of step 304 and any steps corresponding to the feature-triggering symbols. In another example, each persistent element is associated with a respective subset of the symbol array (e.g., a column or row) such that any value-bearing symbols landing within the respective subset triggers an award accumulation event. In certain embodiments, at least a portion of the feature-triggering symbols are value-bearing symbols or are selectively converted to value-bearing symbols. That is, the feature-triggering symbols include a set of symbols with at least one symbol being a value-bearing symbol indicated by the award indicia, or the feature-triggering symbols may be animated to reveal award indicia in response to certain game events, game conditions, and/or random determinations associated with the game outcome.

The association between a value-bearing symbol and a persistent element (i.e., via a particular value-accumulation event) may be temporary or predefined, and a plurality of associations can be active for a given game outcome, which may include a combination of temporary and predefined associations. The temporary association may be based on the current state of the game (e.g., the presence or absence of feature-triggering symbols), and the predefined association may be defined through a direct link or relationship between the value-bearing symbol and the persistent element. Additional or alternative game conditions and/or game events defining the association between value-bearing symbols and persistent elements may be used, including those described elsewhere herein.

If no value-bearing symbols are determined to be present in the game outcome at step 306, the logic circuitry proceeds to complete any remaining outcome determinations (e.g., step 310) and await the next game outcome. In certain embodiments in which the game feature includes free spins or outcomes and/or the player has provided a wager for a series of game outcomes, the logic circuitry may automatically proceed to generate a subsequent game outcome at step 302 to repeat the method 300.

If one or more value-bearing symbols are detected at step 306, the value-accumulation event is initiated. The value-accumulation event includes accumulating award values from the one or more value-bearing symbols within one or more of the persistent elements. In one example, the value-accumulation event is initiated for any persistent element associated with the feature-triggering symbols present within the array or that initiated the value-accumulation event. In another example, all persistent elements are associated with the value-accumulation event, where the award values from the value-bearing symbols are aggregated by all or a portion of the persistent elements (e.g., the award values of each value-bearing symbol is randomly aggregated by one of the persistent elements). Each value-bearing symbol may be aggregated once, once for each persistent element are associated with the value-accumulation event, or another suitable number of times, including aggregated more than once by a given persistent element. If a value-bearing symbol is aggregated more than once for a given value-accumulation event, the award value of value-bearing symbol may remain the same for each aggregation or change between aggregations, where the award indicia of the value-bearing symbol is updated to reflect the new award value.

Although the term "aggregation" used above indicates adding the value of the value-bearing symbol to a preexisting award value of the persistent element, it is to be understood that additional or alternative forms of changing the award value associated with the persistent element may be used in certain embodiments. For example, the award value of the value-bearing symbol may replace the award value of the persistent element, may be divided between two or more persistent elements, may be multiplied, and/or may change the award value of a persistent element through additional or alternative suitable logical and/or mathematical operations (i.e., the resulting award value of the persistent element is at least partially a function of or based on the award value of the value-bearing symbol).

At step 308, the presentation assembly is configured to update the award indicia of the persistent element associated with the value-bearing symbol detected in step 306 (and, by extension, the value-accumulation event) based on the award value indicated by the value-bearing symbol. In some embodiments, the persistent elements are associated with a preexisting award value indicated by the award indicia, which may be a default or initial value or a value accumulated from prior value-accumulation events and/or other suitable game events. In other embodiments, the persistent element may not be associated with a preexisting award value, and therefore the award indicia is not presented until step 308.

In at least some embodiments, the persistent elements have different default award values such that one persistent element may be viewed as more valuable than another persistent element, at least initially. In certain embodiments, the feature-triggering symbols associated with different persistent elements (or the different persistent elements themselves) may result in different award accumulation functions performed using at least the awards from the value-bearing symbols. In one example, an award value from a given value-bearing symbol is added to the value of a first persistent element, while the award value from the value-bearing symbol is combined with a multiplier prior to a second persistent element accumulating the award value. To balance the different values of the persistent elements as perceived by the player, the random determinations for landing a feature-triggering symbol, triggering a value-accumulation event, the value of the value-bearing symbols in a value-accumulation event, triggering a bonus game feature, and the like may be weighted differently for each persistent element. The difference in weighting parameters may be static through the game feature or dynamic in response to one or more game events or conditions (e.g., the award value of a persistent element reaching or exceeding a predefined threshold value).

At step 310, another outcome determination is performed. More specifically, the game-logic circuitry determines, in response to a trigger event, whether or not to initiate a bonus game feature. In the example embodiment, a trigger event includes the presence of a feature-triggering symbol within a game outcome (e.g., the symbols associated with step 304). Each feature-triggering symbol within the game outcome may be treated as a separate trigger event, or the trigger event may be detected for the game outcome as a whole in response to detecting one or more feature-triggering symbols. In certain embodiments, where trigger events are separated into different types of trigger events associated with one or more persistent elements, one trigger event may be detectable for each type of trigger event. The type of trigger event may be distinguishable by the game elements and/or conditions associated with each event type and/or the visual characteristics of the trigger event (e.g., the color of the feature-triggering symbol). Step 310 may be performed for each trigger event or once and applied to each trigger event. In other embodiments, additional or alternative trigger events (including trigger events including the feature-triggering symbols and at least one additional condition) may be provided and monitored by the logic circuitry. The logic circuitry may store rules or other data elements to define the trigger events and whether or not a corresponding bonus game feature is triggered.

In the example embodiment, step 310 includes at least one random determination (e.g., performed using a random number generator of the logic circuitry) and comparing the random determinations to the stored rules or other data elements that, based on the comparison, define whether or not the game remains within the base game feature or proceeds to the bonus game feature. In at least some embodiments, the random determination is a randomly-generated value within a predefined range, where two or more subranges within the predefined range are associated with different outcomes of the step 310. In the example embodiment, the determination at step 310 is binary—the bonus game feature is either initiated or remains inactive. In other embodiments, additional or alternative branches may extend from the step 310. In one example, the bonus game feature may be initiated at different game states based on the random determination and comparison. In another example, two states may result in the base game feature continuing, where the base game feature continues normally in one state and continues with one or more enhancements (e.g., additional value-bearing symbols, wild symbols, feature-triggering symbols, award multipliers, etc.) in a second state.

In the example embodiment, if the feature game is not triggered in response to a feature trigger event at step 310, the logic circuitry proceeds to perform any remaining outcome determinations (including additional determinations of the step 310 in response to a plurality of detected trigger events) before a subsequent game outcome is generated and presented. However, if the feature game is triggered at step 310, the logic circuitry proceeds to initiate the feature game and perform the subsequent steps associated with the feature game.

In the example embodiment, the interface of the feature game is similar to the base game associated with steps 302-310. That is, the feature game interface includes one or more persistent elements and a symbol array for presenting the game play of the feature game. The feature game interface may include at least some visual and/or game element differences to the base game interface. In one example, the persistent elements associated with the feature game (which may be referred to as "active persistent elements" or "primary persistent elements" during the feature game) are highlighted, enlarged, or otherwise changed in visual appearance while any persistent elements not associated with the feature game or the trigger event (which may be referred to "non-active persistent elements" or "secondary persistent elements") may be hidden or presented in a diminished or inactive state. In another example, the symbol array may be expanded to include additional symbol positions. In a further example, an award wheel, additional symbol, and/or other suitable game elements may be added to the feature game interface relative to the base game interface. It is to be understood that other suitable presentation and interface configurations may be used to facilitate the game functions described herein and other suitable game functions compatible with the functionality described herein.

In at least some embodiments, the feature game includes a limited duration, where, upon completion of the feature game duration, the game returns to the base game. The duration may be predetermined (e.g., ten game outcomes) or dynamic such that the duration may be extended, reduced, or determined through game events and/or conditions detected with the play of the feature game. The transition between the base game and the feature game may include one or more animations and/or other visual changes to the game interface. In some embodiments, at least some elements may be carried between the base and feature game. For example, symbols present within the symbol array when the trigger event is detected at step 310 may remain within the array until new symbols populate the symbol array.

At step 312, the logic circuitry and the presentation assembly generate and present a feature game outcome, respectively. More specifically, the symbol array is selectively populated with randomly selected symbols. The randomly selected symbols may be from the same or different set or sets of available symbols from the base game. In some embodiments, the set of available symbols may be the same, but one or more symbols include different weight parameters and/or additional or alternative game functions, including those described elsewhere herein.

In the example embodiment, the available set or sets of symbols for the feature game include value-bearing symbols similar to the base game. That is, the award values indicated by the value-bearing symbols may be collected by or otherwise change the award values of one or more persistent elements. In the example embodiment, unlike the base game value-accumulation events described with respect to steps 306 and 308, the feature game value-accumulation events do not require any feature-triggering symbols to be present with the value-bearing symbols. That is, any value-bearing symbols are added to the persistent element or elements associated with the feature game. In certain embodiments, the secondary persistent elements may be configured to still be included within one or more types of value-accumulation events within the feature game, such as the value-accumulation events meeting the base game requirements (e.g., step 306). As a result, at least the persistent element associated with the feature game continues to accumulate award values through play of the feature game.

Additional symbols may be available for selection within the feature game, such as an award symbol. The award symbol is a symbol associated with an award trigger as described herein. The award symbol may be a dedicated symbol for the functions described herein, or the award symbol may include additional functionality. In one example, the award symbol has other functions within the base game (e.g., a standard symbol or wild symbol) that is enhanced during the feature game. In another example, the award symbol is only available within the feature game. In such an example, the award symbol may replace a symbol from the base game set of available symbols during the feature game. The award symbol is configured to be visually distinguishable from other types of symbols within the symbol array. As described herein, the award symbol may selectively include award indicia to visually indicate an associated award value. In some embodiments, the available symbols may include two or more types of award symbols, where the different types of award symbols are associated with different award triggers, award sequences and/or persistent elements. The types of award symbols and/or award triggers may be visually distinguishable from each other via the feature game interface to indicate the different function or linked game elements.

At step 314, the logic circuitry performs one or more feature game outcome determinations according to the feature game configuration. More specifically, in the example embodiment, the logic circuitry determines whether or not an award trigger is present within the feature game outcome. In the example embodiment, the award trigger includes the presence of an award symbol within the symbol array within the feature game outcome. The award trigger may include a number of award symbols reaching or exceeding a threshold amount and/or other suitable conditions. In one example, the award trigger includes three or more award symbols occupying the symbol array concurrently or over the duration of the feature game. Additional or alternative award triggers may be available and detectable within the feature game based on the game elements of the feature and/or conditions associated with the gaming session, such as wager frequency and/or amount.

Similar to the feature trigger events, although the step 314 is shown to have a binary outcome, additional and/or alternative branches may be initiated based on the determination at step 314. In one example, an award sequence and/or the corresponding award may differ for each type of award trigger available during the feature game. In another example, multiple award triggers may be required to initiate an award sequence. In a further example, the logic circuitry may be configured to randomly determine whether or not the award trigger is active at step 314. That is, if the award trigger is determined to be inactive, the logic circuitry proceeds as if the award trigger was not present in the feature game outcome.

In the example embodiment, if the award trigger is detected, the logic circuitry proceeds to step 316. The logic circuitry causes the presentation assembly to present an award sequence associated with the persistent element of the feature game. More specifically, the award indicated by the award indicia of the persistent element associated with the feature trigger event and, by extension, the feature game, is provided via the award sequence. In some embodiments, the award indicia may be applied to the award symbol to visually indicate the link between the persistent element and the award trigger and the amount of the award for the award trigger. In other embodiments, other suitable animations and/or presentation elements are used to visually indicate the award sequence.

In one example of the steps 312-316, the feature game is initiated for a first persistent element. The feature game interface focuses on the first persistent elements and its corresponding award indicia. Through the feature game, any value-bearing symbols that occupy the symbol array are accumulated and aggregated by the first persistent element to increase the award value of the award indicia. In response to detecting an award symbol within the symbol array during the feature game, the current award indicated by the award indicia of the first persistent element is provided as an award to the credit balance of the player via an award sequence that visually indicates to the player the award trigger and the award through one or more animations and/or presentation elements.

Following the award sequence and the corresponding award being applied to the credit balance of the player, the award indicia of the persistent element may remain the same or the award indicia may be reset to a reset value. The reset value may be predefined, randomly selected from a range or set of predefined values, or based on one or more additional or alternative game conditions. In certain embodiments, the reset value may be at least partially based on the awarded value from the award sequence, where the reset value is a function of the awarded value (e.g., ten percent of the awarded value). In some embodiments, one or more other persistent elements may be reset to respective reset values in response to the award sequence. In one example, all of the persistent elements are reset to their respective reset values in response to the award sequence.

The determination at step 318 is performed in response to determining at step 314 that no award trigger is present in a feature game outcome and following the award sequence in the step 316. More specifically, the logic circuitry determines whether or not the feature game has any remaining duration (e.g., remaining game outcomes or spins). In at least some embodiments, the logic circuitry monitors one or more stored variables or flags that track the duration of the feature game. That is, the logic circuitry counts the number of feature game outcomes that have been generated (or the specific game events or conditions that define the duration of the feature game) and compares the count to a termination value, where reaching or exceeding the termination count causes the feature game to conclude. Additional or alternative termination conditions may be used to determine whether or not the feature game continues at step 312 for a subsequent feature game outcome. In one example, the award sequence at the step 316 may trigger a termination condition such that each feature game instance can only have one award sequence.

If the feature game has any remaining duration, the logic circuitry proceeds to repeat steps 312-318 for a subsequent feature game cycle. If the feature game has no remaining duration and/or another termination condition is detected, the logic circuitry concludes the feature game and returns to the base game step 302. The transition between the feature game and the base game may be visually presented to the player in a manner in which the player readily understands the change in game functions. For example, if the persistent element of the feature game was presented in an enhanced or focused manner relative to the other persistent elements, the enhanced persistent element may be updated to a reduced or normalized configuration. In at least some embodiments, similar to the award sequence, the award indicia of one or more persistent elements, particularly the persistent elements associated with the concluded feature game, may be reset at the resumption of the base game. In certain embodiments, the award indicia of the primary persistent element or elements are reset at the conclusion of the feature game, while the award indicia of any secondary persistent elements is fully or partially carried into the base game. The method 300 may then proceed to repeat the steps until the gaming session is concluded (e.g., by player input, inactivity, lack of sufficient credit balance, etc.) and the logic circuitry performs the steps described herein for providing the player with any remaining credit balance.

Although the method 300 is described above with respect to a feature game include award triggers and corresponding award sequences associated with the persistent elements, it is to be understood that in other embodiments, the method 300 may be additionally or alternatively configured for use within a base game. That is, the award symbols may be available within the base game, and the logic circuitry is configured to perform the determination at step 314 with the other outcome determinations 306 and 310.

FIGS. 6A-6G depict an example game interface of a gaming system (e.g., the system shown in FIGS. 1 and 2) according to one or more embodiments of the present disclosure. The game interface is presented by a presentation assembly of a gaming machine within the gaming system. The presentation assembly is in communication with game-logic circuitry of the gaming system to perform the functions described herein. The interface includes elements similar to the interface shown in FIG. 4. More specifically, the interface includes a credit meter 400, a bet meter 402, a win meter 404, a symbol array 410, a first persistent element 412, a second persistent element 414, and a third persistent element 416. In the illustrated example, the persistent elements 412, 414, 416 are presented as pots filled with coins. In other embodiments, the interface may include additional, fewer or alternative presentation and/or game elements, including those described elsewhere herein. In one example, the persistent elements 412, 414, 416 have different visual appearances with similar game functions as described herein. Although the interface in FIGS. 6A-6G is shown to be a single interface, it is to be understood that the interface may be divided across a plurality of presentation devices (e.g., two displays) in certain embodiments.

Figure 6A:
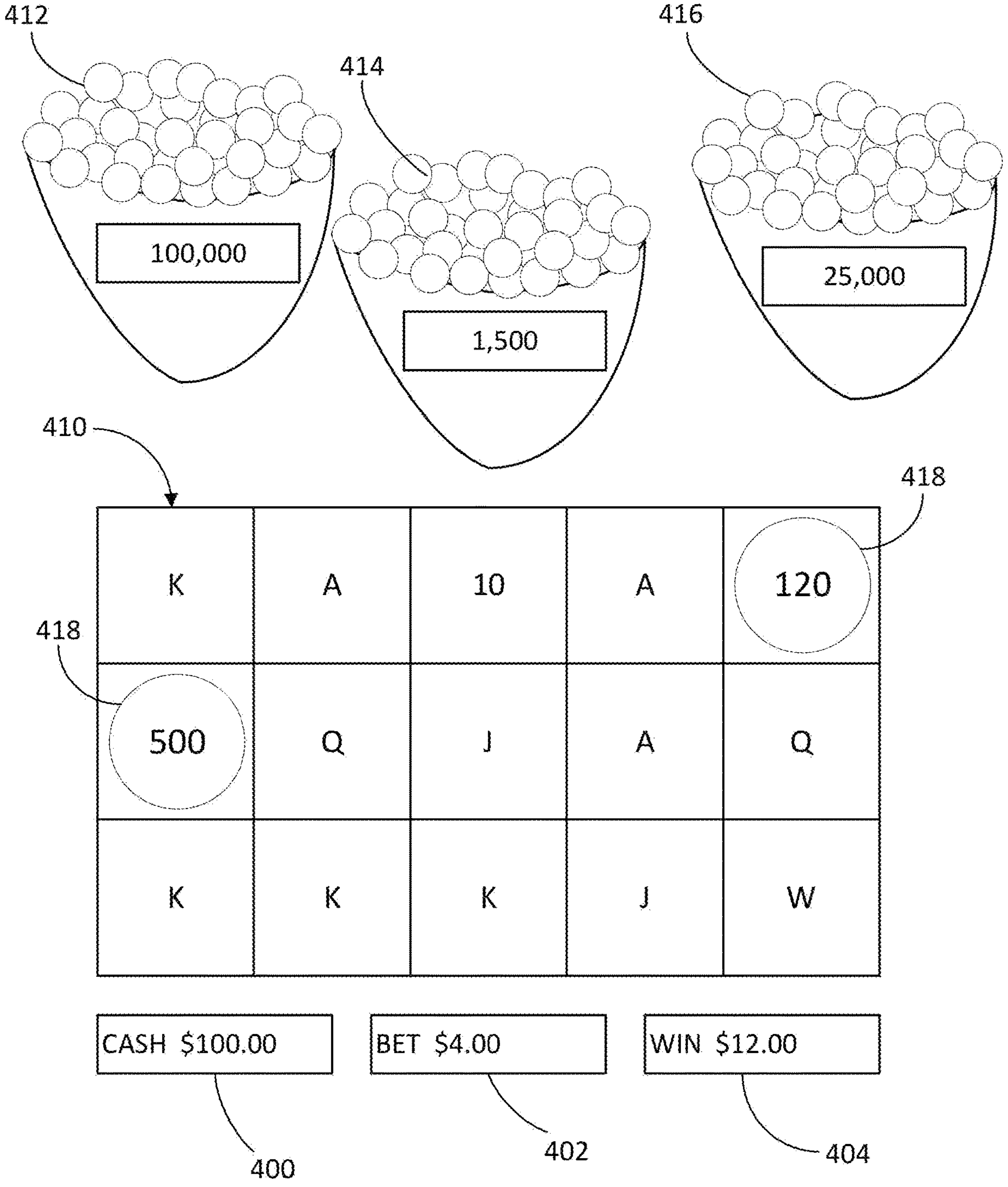
FIG. 6A is an exemplary game interface presented by a gaming presentation assembly for a game feature in an exemplary first state.

FIG. 6A depicts the game interface in a first state. In the first state, a first game outcome of a base game is presented by populating the symbol array 410 with a plurality of randomly selected symbols. As indicated by the bet meter 402 and the win meter, the player has wagered and received an award for winning symbol combination (i.e., the three 'K' symbols in the bottom row). In addition to the winning symbol combination, the symbol array 410 is populated by two value-bearing symbols 418. The value-bearing symbols 418 include award indicia that visually indicates a corresponding award value. In the example embodiment, the value-bearing symbols 418 alone are not sufficient to trigger a value-accumulation event with any of the persistent elements 412, 414, 416. That is, a feature-triggering symbol is required in addition to the value-bearing symbols to trigger a value-accumulation event. Accordingly, the award indicia of the persistent elements 412, 414, 416 remain unaffected by the value-bearing symbols 418. In other embodiments, additional or alternative criteria for value-accumulation events may be used that may cause the first state to result in a value-accumulation event.

In the example embodiment, the persistent elements 412, 414, 416 are shown in the first state with default or initial values indicated by their respective award indicia. The different initial values establish a perceived hierarchy between the persistent elements 412, 414, 416, and the symbols corresponding to each persistent element (e.g., the feature-triggering symbols shown herein) may be weighted accordingly to reflect this perceived hierarchy. For example, feature-triggering symbols associated with the first persistent element 412 may have a substantially less probability of occupying the symbol array 410 in comparison to the feature-triggering symbols associated with the second persistent element 414.

Figure 6B:
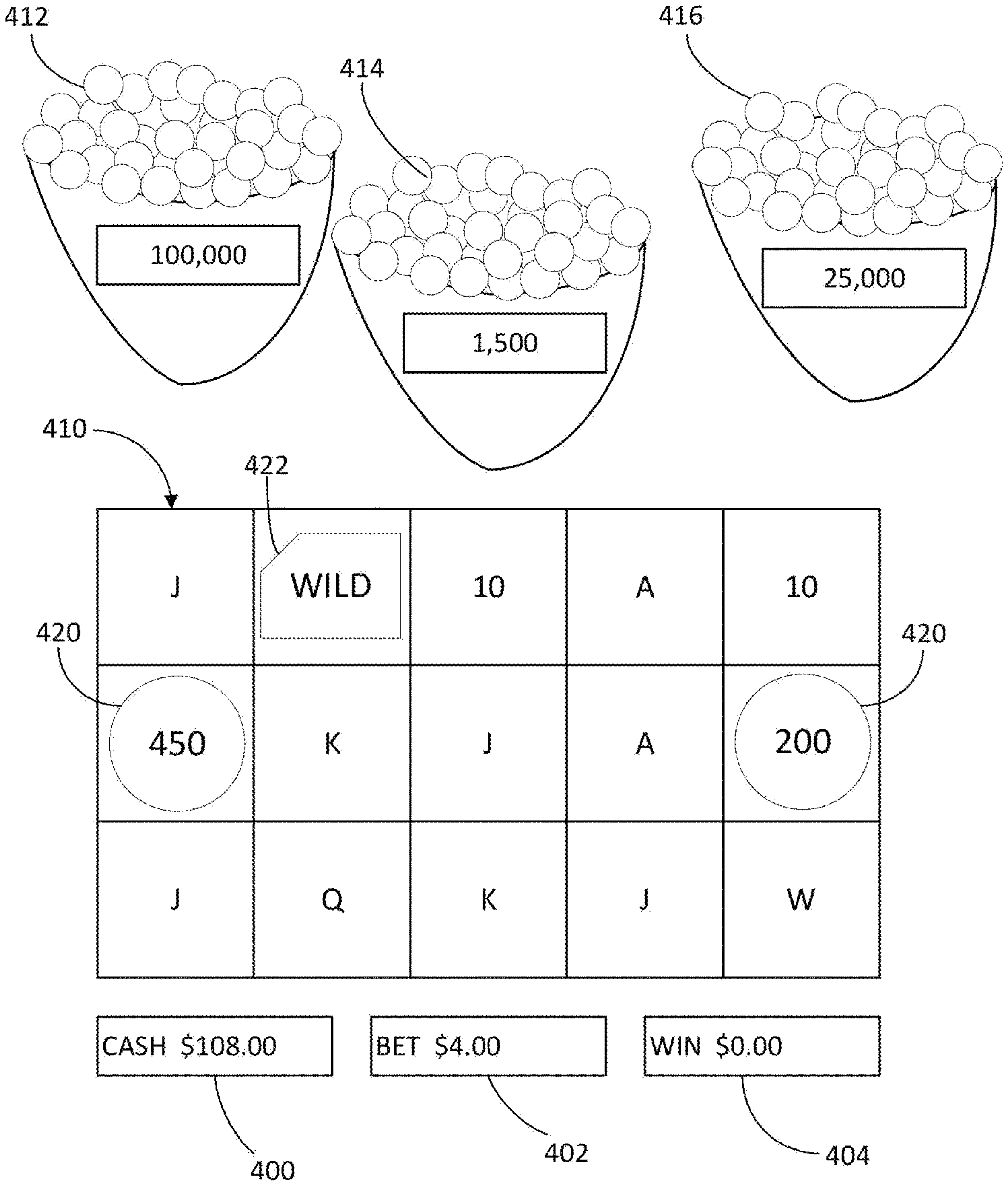
FIG. 6B is the game interface of FIG. 6A for the game feature in an exemplary second state.

FIG. 6B depicts the game interface in a second state following the first state. The second state depicts a subsequent base game outcome, where the symbol array 410 is populated with a new set of symbols. The new set of symbols includes value-bearing symbols 420 and a feature-triggering symbol 422 associated with the second persistent element 414. The second persistent element 414 and/or the feature-triggering symbol 422 may include visual characteristics that link each other together and/or distinguish from other persistent elements and/or types of feature-triggering symbols. In other embodiments, the visual link may be expressed through animations rather than characteristics of the game elements.

In the second state, a value-accumulation event is detected. More specifically, the value-accumulation event includes the presence of both a feature-triggering symbol 422 and the value-bearing symbols within the array 410. The value-accumulation event is associated with the second persistent element 414 due to the link with the feature-triggering symbol, and the first and third persistent elements 412, 416 are not associated with the value-accumulation event. In some embodiments, the available symbols may include feature-triggering symbols that are linked to more than one persistent element such that the value-accumulation event would be associated with each of the linked persistent elements.

In the example embodiment, in addition to the feature game and event triggering functions described herein, the feature-triggering symbol 422 includes an additional function as a wild symbol for determining symbol combinations. That is, the feature-triggering symbol is treated by the logic circuitry as a wild symbol when the logic circuitry is performing any outcome determinations based on symbol combinations within the array 410. In other embodiments, the feature-triggering symbol 422 has a different function or no additional function. In certain embodiments, each type of feature-triggering symbol has a different game function, or the function of each feature-triggering symbol is revealed within the game outcome presentation.

Figure 6C:
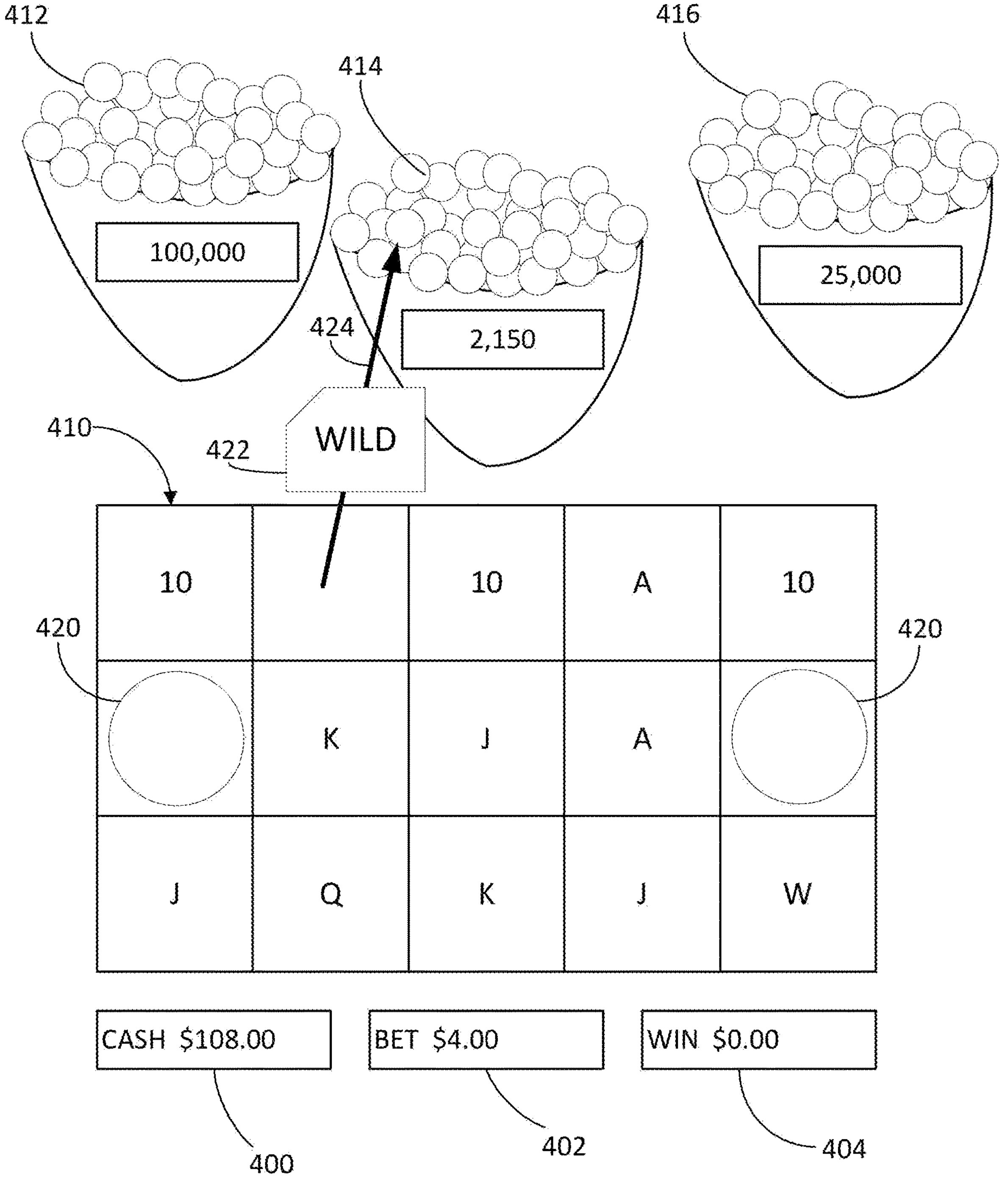
FIG. 6C is the game interface of FIG. 6A for the game feature in an exemplary third state.

FIG. 6C depicts the game interface in a third state following the second state. More specifically, the third state is shown within the value-accumulation event detected within the second state. In the third state, the values of the value-bearing symbols 420 have been collected and aggregated with the preexisting value of the second persistent element 414, and the feature-triggering symbol 422 is animated to fly from the symbol array 410 to the coins within the second persistent element 414.

The collection of the award values of the value-bearing symbols may be visually indicated through one or more suitable animations and/or presentation elements, such as text indicating the game event. In one example, as the values of the value-bearing symbols 420 are added to the value of the second persistent element 414, the award indicia of the value-bearing symbols 420 are removed to indicate that the corresponding award value has been collected. In another example, the value-bearing symbols 420 may be altogether removed from the array 410 in response to the award values being collected. If multiple persistent elements were associated with the value-accumulation event (or multiple events are being presented together), the value-bearing symbols presentation may remain until all updates to the persistent elements have completed.

The change to the award indicia of the second persistent element 414 may persist until another value-accumulation event associated with the second persistent element 414 is detected or the award indicia is reset as described herein. In other embodiments, additional or alternative means may be used to affect the award indicia of the persistent element 414. In one example, after a period of time with no changes to the award indicia, the award indicia may automatically increase or decrease in value. In another example, a counter associated with one or more persistent elements is initiated in response to a value-accumulation event and, in response to the counter reaching a termination value, the award indicia of the associated one or more persistent elements may be reset or otherwise changed.

In the example embodiment, the feature-triggering symbol 422 is animated to fly to the second persistent element 414 as indicated by arrow 424. This animation is independent from any detected value-accumulation event. Rather, the animation of the feature-triggering symbol 422 visually indicates the link between the feature-triggering symbol 422 and the second persistent element 414 and may be used to create perceived persistence with the persistent element 414. That is, the animation of the feature-triggering symbol may result in a visual change to the second persistent element, such as additional coins added, an increase in visual size, and the like. As in the foregoing embodiments of the present disclosure, this visual change to the second persistent element does not affect the underlying feature trigger probability. In other embodiments, the visual change is tied to an underlying change to the probability of triggering a feature game. It is to be understood that the illustrated animation indicated by the arrow 424 is for illustrative purposes only, and that other suitable animations and presentation sequences may be used to perform the functionality described herein.

In the example embodiment, each feature-triggering symbol present within the symbol array 410 for a given base game outcome represents a feature trigger event. The logic circuitry is configured to determine, based at least partially on at least random determination, whether or not to initiate a feature game. In some embodiments, one instance of the feature game is selectively initiated in response to one or more feature trigger events activating the feature game. In other embodiments, each feature trigger event activating the feature game results in a separate instance of the feature game described herein. The interface may be updated to visual indicate to the player whether or not the feature game is triggered. In one example, the interface does not change if the feature game is not triggered, and the interface is configured to transition to a feature game interface if the feature game is triggered. Transitioning to the feature game interface may include highlighting or otherwise indicating the feature-triggering symbols and/or persistent elements associated with the feature trigger event that activated the feature game.

Figure 6D:
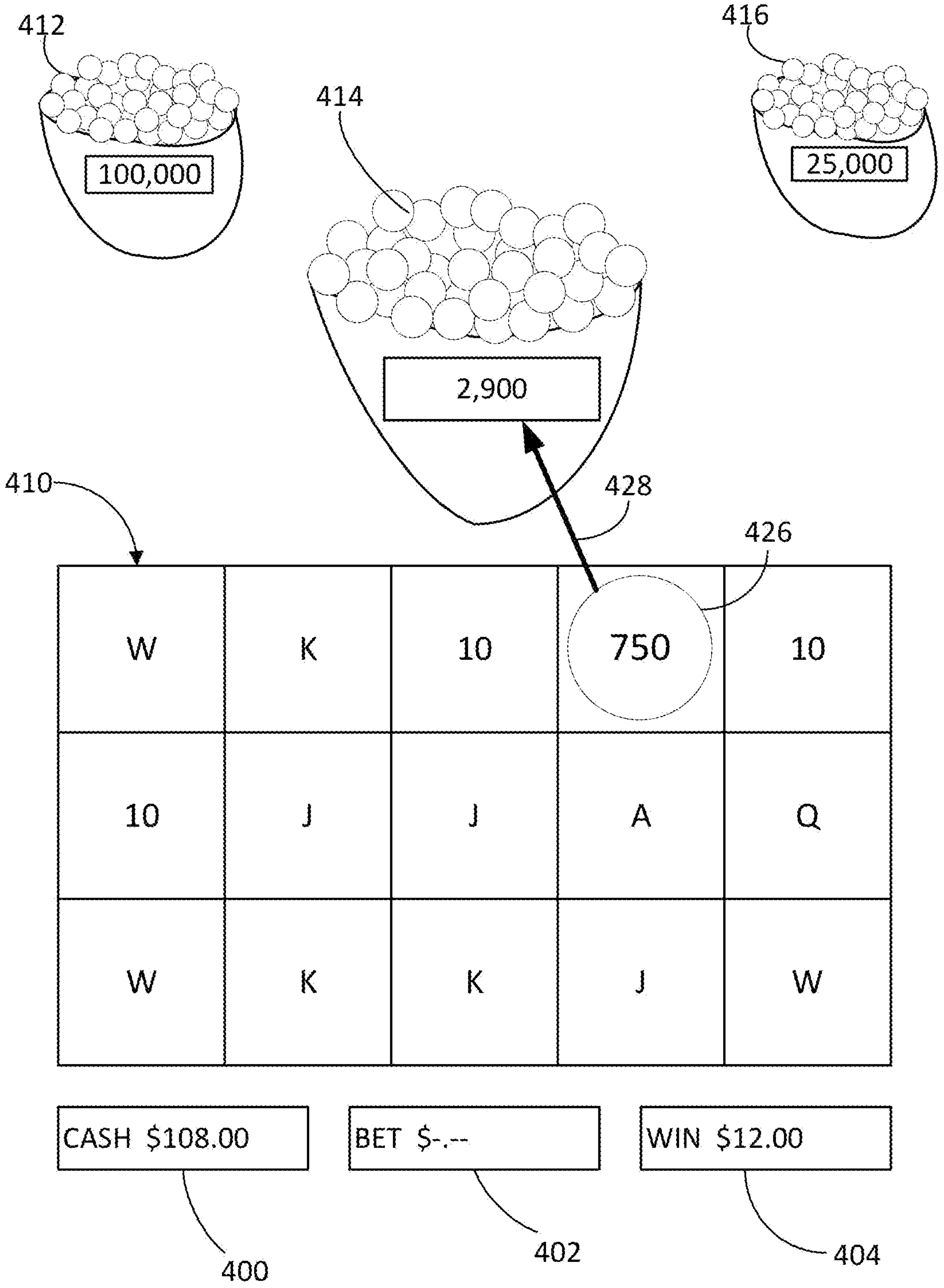
FIG. 6D is the game interface of FIG. 6A for the game feature in an exemplary fourth state.

FIG. 6D depicts the game interface in a fourth state following the third state. In the fourth state, a feature game has been triggered (i.e., in response to the feature-triggering symbol 422, shown in FIG. 6C), and a feature game outcome is shown. In the example embodiment, the feature game interface is similar to the base game interface shown in FIGS. 6A-6C. However, the visual appearance of the persistent elements 412, 414, 416 has changed. More specifically, the second persistent element 414 has a focused or relatively larger appearance to indicate the element 414 is associated with the feature game, while the first and third persistent elements 412, 416 are shown in a reduced state to indicate that these elements 412, 416 are not associated with the feature game. In at least some embodiments, the unassociated persistent elements may still be active within the feature game, but the functionality associated with these persistent elements differ from the functions of the persistent elements associated with the feature game. In one example, the unassociated persistent elements may operate similar to persistent elements within the base game. In such an example, feature-triggering symbols (or other forms of feature trigger events) may be available during the feature game, and the unassociated persistent elements may be eligible to gain association with the feature game based on the feature-triggering symbols.

In the example embodiment, the feature game outcome includes selectively populating the symbol array 410 with symbols. The symbols may be selected from a set or sets of available symbols associated with the feature game, which may be the same as or different from the set or sets of symbols associated with the base game. In addition to the functions described herein with respect to the second persistent element 414, other suitable outcome determinations may be performed during the feature game to determine awards and other game events. For example, in the fourth state, a winning outcome is present in the symbol array 410 ('W-K-K' in the bottom row, where 'W' represents a wild symbol). This winning outcome results in an award as indicated by the win meter 404.

During the feature game, no wagers are placed to initiate a feature game outcome as indicated by the bet meter 402. Rather, the feature game is initiated with a limited duration of free spins or free game outcomes. The duration of the feature game may be visually monitored through one or more presentation elements or animations (e.g., a counter presented on the game interface). In other embodiments, the feature game may include wagers.

In the example embodiment, the feature game outcome shown in the fourth state includes a value-bearing symbol 426. Unlike the first state shown in FIG. 6A, where a value-accumulation event required a feature-triggering symbol and, as a result, the value-bearing symbols 418 were not applied to any persistent elements. In the feature game, the value-accumulation events do not require feature-triggering symbols for any persistent elements associated with the feature game. In the illustrated embodiment, the second persistent element 414 is associated with the feature game, and therefore the value-bearing symbol 426 is accumulated by the second persistent element 414 as indicated by arrow 428. More specifically, the award value indicated by the award indicia of the value-bearing symbol 426 is aggregated with the preexisting value of the second persistent element 414. That is, the value of '750' from the value-bearing symbol 426 is added to the value of '2,150' from the persistent element 414 (the value shown in FIG. 6C) to result in the aggregated award value of '2,900'. The award indicia of the second persistent element 414 is updated in response to the value aggregation as shown in FIG. 6D. One or more animations and/or presentation sequences may be used to facilitate presentation of the value-accumulation event.

If more than one value-bearing symbol is present in a feature game outcome, each value-bearing symbol may result in a value-accumulation event (or are included in a single value-accumulation event for the outcome as a whole). In certain embodiments, additional types of symbols may be applied to the persistent elements associated with the feature game. In one example, a modifier symbol may be included within the available symbols of the feature game, where the modifier symbol changes the award value of a value-bearing symbol and/or a persistent element. The modifier symbol may include visual indication of the corresponding modification, which may include any suitable mathematical and/or logical operation applied with the award value of a game element. For example, the modifier symbol may include a multiplier, where the multiplier is applied to the award value of a value-bearing symbol and/or a persistent element.

Figure 6E:
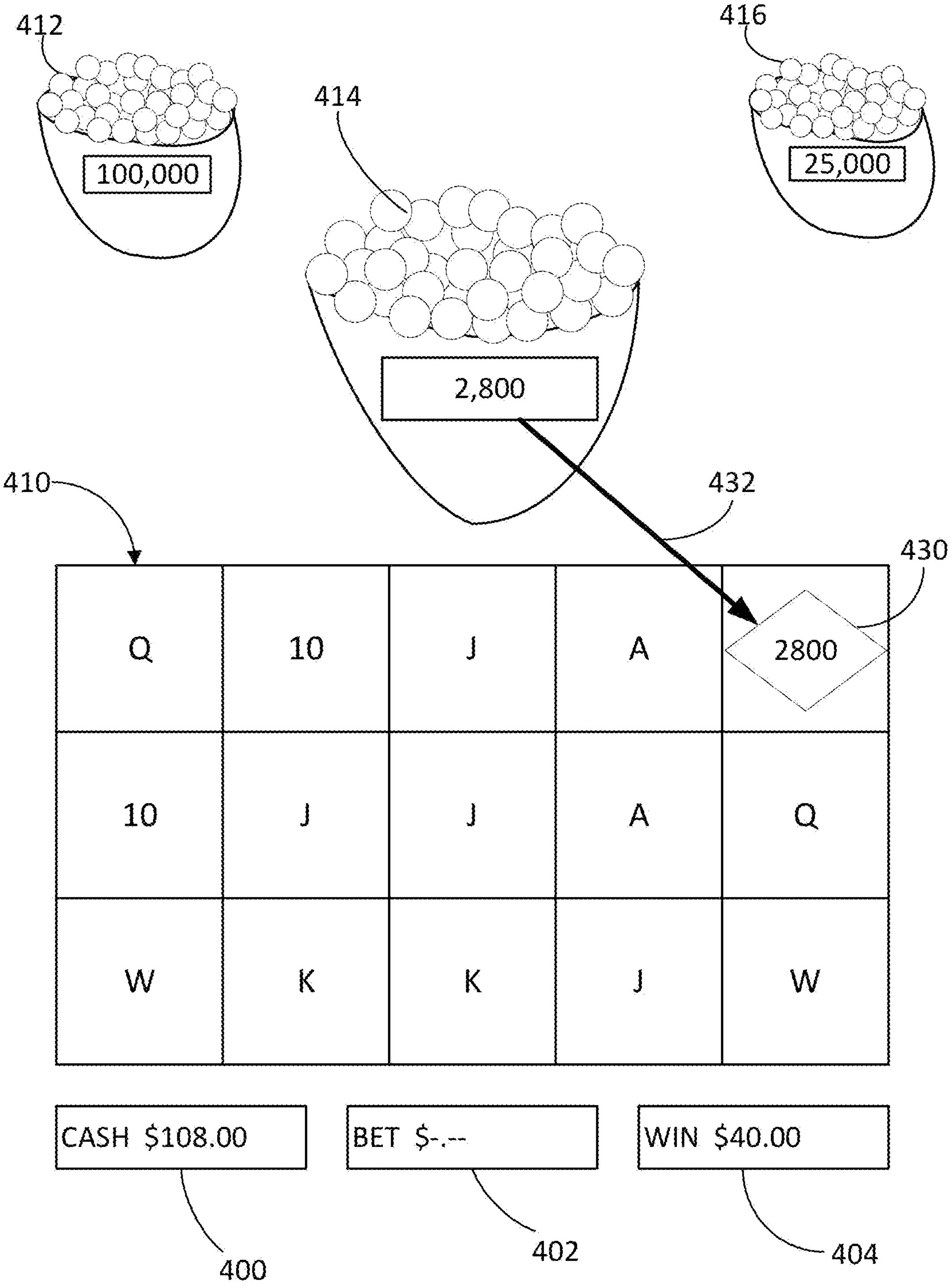
FIG. 6E is the game interface of FIG. 6A for the game feature in an exemplary fifth state.

FIG. 6E depicts the game interface in a fifth state following the fourth state. The fifth state illustrates a second feature game outcome following the feature game outcome in the fourth state. The second feature game outcome includes an award trigger. More specifically, the symbols populating the symbol array 410 includes an award symbol 430.

The feature game includes one or more types of award triggers, with at least one award trigger associated with award symbols in at least some embodiments. In the example embodiment, each award symbol present in a feature game outcome is a respective award trigger. In response to detecting the award trigger, the logic circuitry is configured to initiate, via the game interface, an award sequence for the award indicated by the second persistent element 414. For feature games associated with multiple persistent elements at once, the awards of each associated persistent element may be aggregated together to provide an aggregate award, or there may be different types of award symbols that trigger respective award sequences for each of the associated persistent elements. Other suitable award triggers may be used in addition to or in place of the award symbols. In one example, the award trigger includes detecting a predefined number of award symbols within a given feature game outcome or within a plurality of feature game outcomes. In another example, the award symbols include a type of award symbol that, in addition to the awards of the persistent elements associated with the feature game, may provide an award for one or more unassociated persistent elements (e.g., the first or third persistent element 412, 416).

In the example embodiment, the award sequence includes applying the award indicia of the second persistent element 414 to the award symbol 430 (indicated by arrow 432) and updating the win meter 404. In the illustrated embodiment, a winning symbol combination is also present in the feature game outcome, and the win meter 404 indicates the aggregate award of the winning symbol combination and the award symbol 430. In certain embodiments, the award trigger may not immediately result in an award. That is, the award value of the second persistent element 414 may be applied to the award symbol 430 such that, if the award symbol 430 is included in a winning symbol combination prior to the conclusion of the feature game, the award indicated by the award symbol is provided. Other suitable animations and/or presentation sequences may be used to visually indicate the link between game elements (e.g., the win meter 404, the second persistent element 414, and the award symbol 430) and the corresponding awards.

In certain embodiments, the award sequence may be at least partially delayed until the conclusion of the feature game such that multiple award sequences may be at least partially combined. In one example, the win meter 404 persists for the entire duration of the feature game to show the total awards accumulated from the feature game. At the end of the feature game, the win meter 404 is applied to the credit meter 400.

Following the award sequence, or at least the application of the award value from the second persistent element 414 to the win meter 404 and/or the award symbol 430, the award indicia of the second persistent element 414 may be reset to a default or reset value. In other embodiments, the award indicia of the second persistent element 414 remains following the award sequence and instead is reset at the conclusion of the feature game. In certain embodiments, the award indicia of other persistent elements (e.g., the first and/or third persistent elements 412, 416) may also be reset.

Figure 6F:
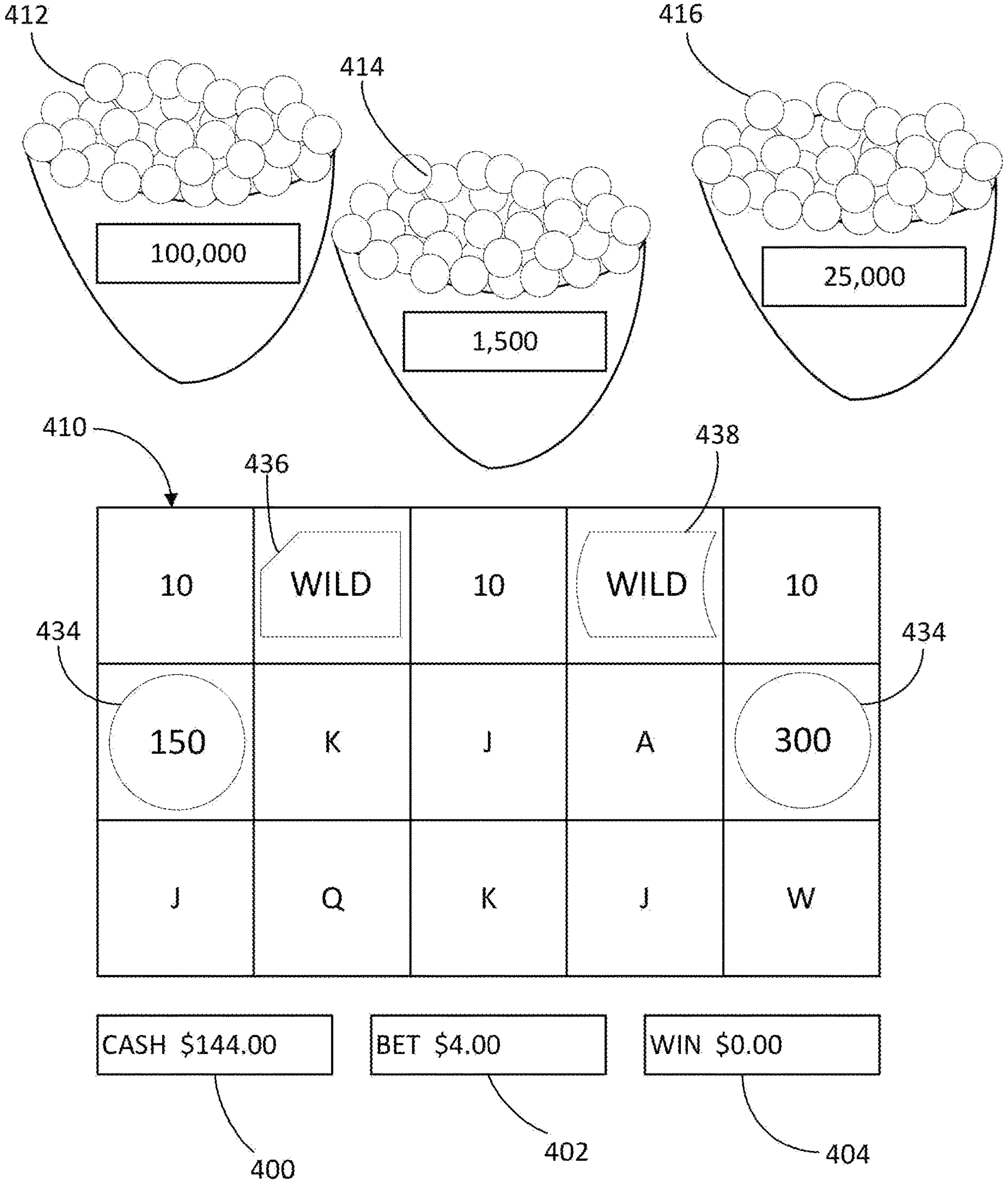
FIG. 6F is the game interface of FIG. 6A for the game feature in an exemplary sixth state.

FIG. 6F depicts the game interface in a sixth state following the fifth state. In the sixth state, the feature game has been concluded and the base game is resumed. The sixth state includes a base game outcome. In comparison to the feature game interface, the persistent elements 412, 414, 416 have been changed for the base game. More specifically, the award indicia of the persistent elements have been reset to respective reset values, and the appearance of the three persistent elements has been adjusted back to a state similar to the states shown in FIGS. 6A-6C. The second persistent element 414 has been reduced in scale to substantially match the first and third persistent elements 412, 416, which have been returned from their reduced state within the feature game. Other suitable animations and/or presentation elements may be used to differentiate the base game interface from the feature game interface, including one or more transition sequences.

In the example embodiment, the base game outcome in the sixth state includes two value-bearing symbols 434, a first feature-triggering symbol 436, and a second feature-triggering symbol 438. The feature-triggering symbols 436, 438 are different types of feature-triggering symbols, where each type of feature-triggering symbol is associated with a different persistent element (or group of persistent elements). In the illustrated embodiment, the different types of feature-triggering symbols are indicated by the shape of the symbols. In other embodiments, additional or alternative characteristics may be used to distinguish between types of feature-triggering symbols, such as color. In certain embodiments, these distinguishing characteristics may be at least partially obscured from the game interface initially and revealed through play of the game. In the example embodiment, the first feature-triggering symbol 436 is associated with the second persistent element 414, and the second feature-triggering symbol 438 is associated with the third persistent element 416.

The logic circuitry, in response to generating the base game outcome, determines at least one value-accumulation event is present in the base game outcome. More specifically, the presence of both value-bearing symbols 434 and feature-triggering symbols 436, 438 in the base game outcome trigger value-accumulation events for the second and third persistent elements 414, 416. In other embodiments, only one value-accumulation event may be active within a base game outcome. In the event of multiple value aggregative event triggers, the awards may be applied to only one of the persistent elements based on a random chance, a predefined hierarchy between persistent elements, game conditions, and/or other suitable parameters, including a plurality of the aforementioned parameters.

Figure 6G:
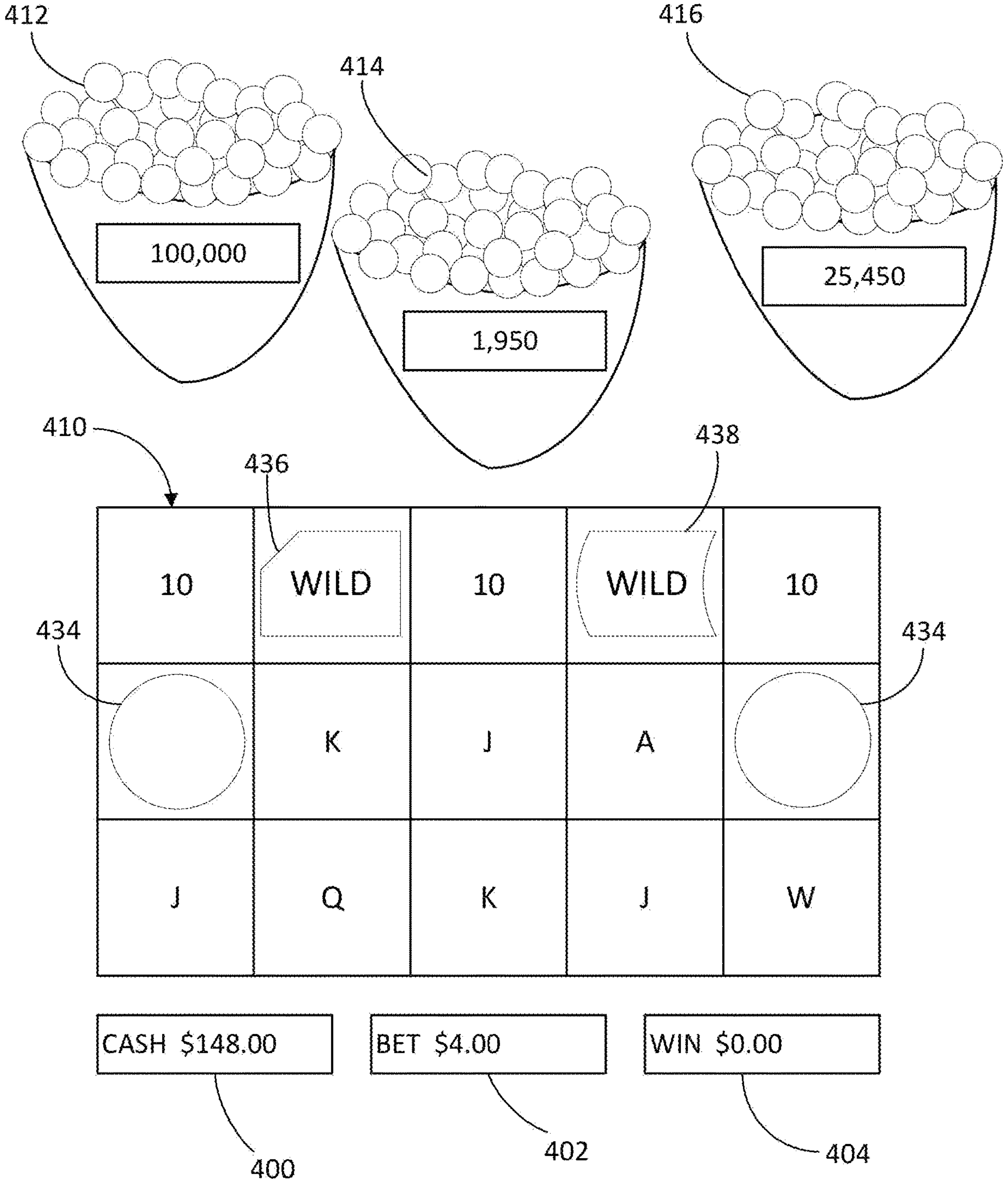
FIG. 6G is the game interface of FIG. 6A for the game feature in an exemplary seventh state.

FIG. 6G depicts the game interface in a seventh state following the sixth state. In the seventh state, the value-accumulation events detected from the base game outcome of the sixth state are applied and presented. That is, the award value of each value-bearing symbol within the symbol array 410 (i.e., the value-bearing symbols 434) as indicated by their respective award indicia are applied to the persistent elements associated with the detected feature-triggering symbols 436, 438 (i.e., the second and third persistent elements 414, 416). In the seventh state, the award indicia of the value-bearing symbols 434 have been removed to indicate the application of the award values, and the award indicia of the persistent elements 414, 416 have been updated accordingly.

In the example embodiment, the entire award value from the value-bearing symbols 434 is aggregated by both persistent elements 414, 416. In other embodiments, other suitable changes to the award values of the persistent elements 414, 416 based on the value-bearing symbols 434 may be used. In one example, the aggregate award value of the value-bearing symbols 434 may be divided between the persistent elements 414, 416. In another example, each value-bearing symbol 434 may be applied to only one persistent element, and the logic circuitry randomly selects which of the two persistent elements receive the corresponding award value.

In at least some embodiments, the features, game functionality, and/or presentations described above may be configured to operate independently of other aspects of the foregoing example systems and methods. In one example, a gaming system may be configured to provide a game including a base game and a feature game using a plurality of persistent elements. In this example, the persistent elements may be selectively associated with a feature trigger event. If a feature trigger event is detected and a feature game instance is initiated, the associated persistent element is provided enhanced game functions and/or presentation relative to the remaining persistent elements, which may also be changed to a reduced state for limited game functionality and/or presentation relative to the feature triggering persistent element. In this example, feature trigger events associated with the reduced persistent elements may remain available within the feature game such that nested feature trigger events are detectable to initiate a new feature game instance or convert the persistent element associated with the nested feature trigger event from a reduced state to an enhanced state, thereby joining the original persistent element associated with the feature game. This functionality may be operational without the value accumulation and award sequences described above and are considered within the scope of the present disclosure. Other suitable aspects of the present disclosure that, unless otherwise specified as interlinked, may be applied independently to gaming systems as reasonably practicable by one of ordinary skill in the art.

Figure 7:
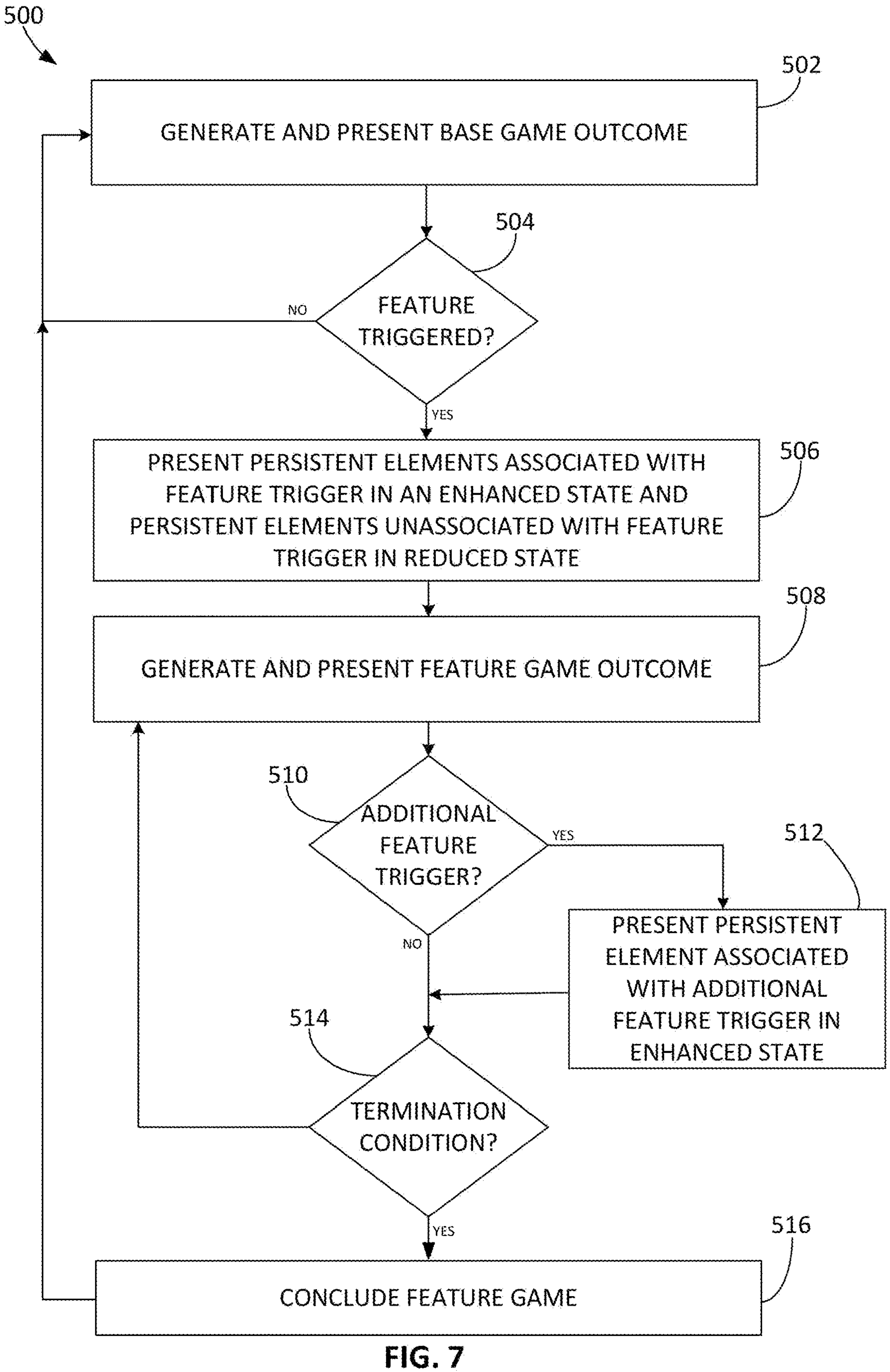
FIG. 7 is a flow diagram of an example method for nested game features using a gaming system according to an embodiment of the present invention.

FIG. 7 depicts a flow diagram of an example method 500 of providing nested feature triggers using a gaming system (e.g., the system shown in FIGS. 1 and 2) according to one or more embodiments of the present disclosure. The method 500 is performed using logic circuitry of the gaming system in communication with a presentation assembly of a gaming machine, which may also include at least a portion of the logic circuitry. In other embodiments, the steps described herein may be performed by another suitable configuration of devices, and/or the method 500 may include additional, fewer, or alternative steps, including those described elsewhere herein.

The method 500 is configured to function within a gaming system performing the steps and presentations described in the foregoing embodiments or independently. That is, other suitable gameplay, functions, and presentations may be used with the method 500. To the extent the foregoing embodiments (e.g., FIGS. 3A-6G) describe steps, functionality, and/or presentation compatible with the following steps and aspects of the method 500 (and vice versa), it is to be understood that such hybrid embodiments are contemplated as within the scope of the present disclosure.

The method 500 is associated with a game including a base game and a feature game. The game may include a symbol array that is selectively populated with symbols and/or other suitable game elements that incorporate random chance to generate and present a game outcome (e.g., a wheel, dice, cards, etc.). The game further includes a plurality of persistent elements that are selectively incorporated within play of the base and feature games as described herein. The persistent elements may the same or similar to the persistent elements described above with respect to FIGS. 3A-6G), or the persistent elements may include different functions and/or presentations. In some embodiments, the persistent elements are configured to provide perceived persistence through a variable presentation responsive to game events. Additionally or alternatively, the persistent elements may include one or more true persistence aspects, where game events or conditions are monitored over a plurality of game outcomes and, via the associated persistent element, impact play and/or presentation of the game.

In the example embodiment, the game associated with the method 500 is initiated at the base game. The initiation of the game is in response to a player initiating a gaming session at a gaming machine. In one example, the player provides a form of credit input (e.g., bills, coins, tickets, cards, tokens, etc.) at the gaming machine to initiate the gaming session. In another example, the player may link a player account or digital credit input to the gaming machine and/or the gaming session. The credit input is used to establish a credit balance that funds the wagers described herein. In some embodiments, the game is not a wagering game, but rather the credit balance may be used to fund play of the game through other means (e.g., extending an allocated play time). The gaming session may include additional games or other features associated with the gaming machine or be limited to the game associated with the method 500.

At step 502, the logic circuitry generates a base game outcome and causes the presentation assembly of the gaming machine to present the base game outcome. The base game outcome may be in response to a player-initiated wager from the credit balance. The generation of the base game outcome is dependent upon the game elements incorporated within the base game, such as the symbol array and any associated symbol-bearing reels. The base game outcome includes at least one random determination (e.g., randomly generating a number) that is compared to a set of predefined outcome elements (e.g., reel stop positions, symbols, dice roll outcomes, etc.) to determine the base game outcome. Additional data elements, such as weight parameters, game events or conditions, and the like may be combined with the random determinations to facilitate desired game functionality. The base game outcome is translated by the logic circuitry and the presentation assembly into an outcome presentation sequence, which includes animations, presentation elements, and the like to visibly convey the outcome to the player.

In addition to showing the outcome elements that form the base game outcome (e.g., the symbols populating the symbol array), the logic circuitry is configured to perform one or more outcome determinations. The outcome determinations include analyzing the state of each game element within the base game outcome (including combinations of elements) and comparing these states to the predefined rules or other stored data associated with base game. For example, the symbols within a symbol array may be compared to a table defining winning symbol combinations to determine whether or not an award should be provided for the base game outcome. Based on the outcome determinations, the presentation assembly is configured to include one or more presentation sequences as required by the determinations. These outcome determinations may be performed and/or presented serially, in parallel, or in a partially overlapping order. The order of the outcome determinations may be at least partially defined, where some or all the outcome determinations must occur in a particular order according to the design of the base game.

In the example embodiment, one outcome determination is shown in step 504. More specifically, the logic circuitry determines whether or not a feature trigger event is detected within the base game outcome. The feature trigger event is a game event that initiates the feature game. In certain embodiments, the feature trigger event selectively initiates the feature game, where a secondary condition is required (e.g., a random determination) to proceed with the feature game. If the secondary condition is not fulfilled, the game continues within the base game feature. In one example, the feature trigger event includes the presence of a particular feature-triggering symbol within a symbol array. In another example, a particular combination of symbols may be required, such as a threshold number of feature-triggering symbols. Other suitable feature trigger events, such as particular dice rolls, card combinations, and the like may be used according to the particular game configuration.

The feature trigger event is selectively associated with one or more of the persistent elements, which may be indicated through game elements and/or presentation of the feature trigger event highlighting or otherwise visually linking to the associated persistent elements. In one example, the game element or elements of the feature trigger event may share a color, shape, or theme with the associated persistent element. The persistent elements are each associated with one or more of an award, gameplay modifier, feature game type, visual theme, and/or the like that is activated within at least the feature game. In one example, the persistent elements include respective award indicia indicating an accumulated award value, and the accumulated award value may be provided as an award with the feature game. In another example, the persistent elements are associated with particular gameplay modifiers, such as a first persistent element associated with additional wild symbols and a second persistent element associated with additional free spins or game outcomes.

At step 504, if the logic circuitry determines no feature trigger events are present in the base game outcome, the logic circuitry performs any remaining outcome determinations before awaiting a subsequent base game outcome. In certain embodiments in which the feature game is in response to a feature trigger event and a secondary condition, if the secondary condition is not met, the logic circuitry may also await the subsequent base game outcome without proceeding through the method 500. However, one or more feature trigger events are detected (and, in some embodiments, a secondary condition is met), a corresponding feature game is initiated. Initiating the feature game may result in the game interface transitioning from a base game interface to a feature game interface, which may include one or more animations, new presentation and/or game elements, and/or changes to the elements from the base game interface.

In the example embodiment, the feature game interface includes a persistent element presentation that enables the player to readily identify and distinguish between the persistent elements associated with the feature game and the persistent elements unassociated with the feature game. More specifically, at step 506, the persistent element or elements associated with the feature game (i.e., primary persistent elements) are presented in an enhanced state and persistent elements unassociated with the feature game (i.e., secondary persistent elements) in reduced state. The primary and secondary persistent elements may also be referred to as "enhanced persistent elements" and "reduced persistent elements" herein, respectively. It is to be understood that the enhanced and reduced states are relative to each other. That is, one or more persistent elements may not change in appearance from the base game interface, while another persistent element changes in appearance to create the presentation disparity of the step 506. In some embodiments, additional states may be applied to the persistent elements based on random chance and/or game events or conditions. The visual states of the persistent elements are shown through any suitable visual characteristic or set of characteristics, accompanying presentation elements, and/or other suitable forms of presentation that enable the player to readily distinguish between the two types of persistent elements within the feature game. In one example, the persistent element associated with the feature game is increased in size and centered within the game interface, and the remaining persistent elements are reduced in scale and are limited in presentation relative to the associated persistent element.

In addition to the visual differences, gameplay associated with the enhanced and reduced persistent elements may differ. In one example, the enhanced persistent element may be incorporated within play of the feature game, such as potential award triggers, while the reduced persistent elements are not incorporated within the feature game. In another example, the enhanced persistent element is associated with one set of predefined game functions within the feature game, while the reduced persistent elements are associated with a second set of predefined game functions, which may be a subset of the first set or an otherwise limited set of functions. In a further example, both the enhanced and reduced persistent elements maintain the same game functions as the base game, but the enhanced persistent elements include one or more additional or enhanced game functions. As described herein, however, the reduced persistent elements and/or other linked game elements are configured to provide nested feature game triggers that may convert the reduced persistent elements to enhanced persistent elements.

At step 508, the logic circuitry generates a feature game outcome and causes the presentation assembly to present the feature game outcome. Similar to the base game outcome, the logic circuitry performs one or more outcome determinations based on the game elements defining the feature game outcome. For example, at step 510, the logic circuitry determines if any new or additional feature trigger events are detected within the feature game outcome. That is, feature trigger events may still be available within the feature game to extend the feature game, change the state of the feature game, and/or initiate a new instance of the feature game. The feature trigger events may be same as the feature trigger events of the base game, or the feature trigger events may include additional, fewer, or alternative events, including those described elsewhere herein. In one example, the feature trigger events include populating a symbol array with one or more feature-triggering symbols. In another example, the feature trigger events include at least one event that randomly converts a persistent element irrespective of the symbols in the symbol array (or causes the logic circuitry to adjust the symbols of the feature game outcome to include a guaranteed trigger event).

In certain embodiments, the feature trigger events are limited to events associated with the reduced persistent elements. In other embodiments, the feature trigger events may include events associated with any persistent element (or no persistent element). In such embodiments, the feature trigger events associated with the primary or enhanced persistent element may result in alternative or additional changes to the feature game. In one example, a reduced persistent element is randomly selected to be converted to an enhanced persistent element. In another example, the duration of the feature game is extended. In a further example, the award indicia of the enhanced persistent element is increased or progression towards a progressive jackpot award is updated (which may include immediately awarding the progressive jackpot in response to one feature trigger event). In one or more embodiments, the feature trigger events associated with the enhanced persistent element include one or more functions unassociated with the enhanced persistent element that may be active at least within the feature game.

If an additional feature trigger event is detected, the method 500 proceeds to step 512. In certain embodiments, similar to the feature trigger event of step 504, a secondary condition may be required to proceed to the step 512. At the step 512, the one or more reduced persistent elements associated with the feature trigger event may be converted to enhanced persistent elements associated with the remainder of the feature game. The association between the reduced persistent elements and the feature trigger event may be predefined or dynamic, where the one or more reduced persistent elements are randomly selected for the step 512 in response to the feature trigger event. The presentation sequence may be configured to perform a transition sequence to update the feature game interface accordingly. The duration of the feature game may also be extended in certain embodiments, such as resetting the number of free game outcomes to an initial amount. In some embodiments in which the feature trigger events may be associated with enhanced persistent elements, the enhanced persistent elements and/or other game elements may be further enhanced or otherwise changed, such as increasing the award indicia of the enhanced persistent element.

In certain embodiments, rather than or in addition to incorporating the reduced persistent elements into the currently active feature game instance, the feature trigger event may initiate another feature game instance with the persistent element associated with the feature trigger event. This new feature game instance may be presented in parallel to the original instance, or the two instances of the feature game may linked, such as in a nested configuration. That is, play of one feature game instance is conducted to conclusion, and then at least some parameters (award indicia, game elements, etc.) are carried into the other feature game instance. The transition between nested instances may be seamless (i.e., the player is not visibly notified of the change), or the transition may be visually indicated through one or more presentation sequences. In one example, the original feature game instance is played to conclusion, and the award indicia of the enhanced persistent element is carried into the second feature game instance that also includes the persistent element associated with the additional feature game trigger in an enhanced state. Other suitable means of carrying persistence between feature game instances may be used based on the configuration of the feature game.

In the example embodiment, following step 512 or if no additional feature trigger event is detected in step 510, the logic circuitry performs any remaining outcome determinations associated with the feature game outcome, including the determination at step 514. More specifically, at step 514, the logic circuitry determines whether or not a termination condition of the feature game has been met. The termination condition in part defines the predefined or dynamic duration of the feature game. Any suitable game parameter that can be monitored by the logic circuitry and compared to one or more predefined variables can be used for the termination condition. In some embodiments, at least one termination condition includes the number of feature game outcomes generated reaching or exceeding a threshold value, or an active timer for the feature game reaching a time limit. Additional and/or alternative termination conditions may be used and analyzed by the logic circuitry in view of the current state of the feature game.

If no termination condition has been met, the feature game continues at step 508 for a subsequent feature game outcome. If a termination condition is met, the feature game is concluded at step 516, and the presentation assembly transitions the game interface back to the base game interface (or another suitable game interface) for play of the base game at step 502. The cycle of the method 500 may continue until the player initiates a cashout sequence or another condition is met to conclude the gaming session (e.g., a period of inactivity or the credit balance having insufficient funds). For the cashout sequence, the player may be provided with a digital or physical output that indicates the credit balances are back in the possession of the player.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature triggering process described with respect to FIGS. 3A-4, if no coin symbol C1, C2 or C3 appears in the array at step 112, the game-logic circuitry foregoes any random determination of whether a game feature will be awarded. Furthermore, if any coin symbols do appear in the array, regardless of the number of pots and associated game features that may be won in parallel, only a single invocation of the RNG at step 116 is required to determine whether any game feature will actually be triggered. In contrast, in typical prior art systems with mystery bonus triggers, the game-logic circuitry makes a random determination in each and every wagering game cycle and for each and every game feature that may be won, thereby reducing processing efficiency compared to the method presented herein.

Embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. Further, the process collects displayed values borne by special symbols (i.e., value-bearing symbols) on persistent elements, such as a coin pot, and selects the collected values from the persistent elements according to stored, variable criteria for an award. In this way, the value-bearing symbols and persistent elements provide building blocks for innumerable different collection and selection sequences simply by manipulating the criteria associated with the value-bearing symbols and persistent elements, resulting in fewer rules needed for the award process than would be necessary for calculating values of winning symbol combinations enumerated in stored pay-tables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

conducting, by game-logic circuitry, a base game including:

presenting, by a presentation assembly, a graphical game interface in a base game state including a plurality of symbol-bearing base reels, a base array, and at least one persistent element including a first persistent element with award indicia;

spinning and stopping the plurality of symbol-bearing base reels to land symbols from the plurality of symbol-bearing base reels in the base array;

in response to the landed symbols including a value-bearing symbol associated with the first persistent element, accumulating, for the first persistent element, the value-bearing symbol by accessing a stored value for the first persistent element from a memory of the game-logic circuitry, aggregating the award value from the value-bearing symbol with the stored value to create an updated value, storing the updated value in the memory, and updating, via the presentation assembly, the award indicia of the first persistent element at least partially as a function of an award value visually indicated by the value-bearing symbol;

in response to the landed symbols including at least one feature-triggering symbol associated with the first persistent element:

animating, by the presentation assembly, an addition of the feature-triggering symbol to the first persistent element; and randomly determining whether or not to trigger one or more game features associated with the first persistent element; and in response to triggering the one or more game features, implementing, by the game-logic circuitry, the one or more game features, including:

animating, by the presentation assembly, the graphical game interface to transition to a feature game state including a plurality of symbol-bearing bonus reels, a bonus array, and the first persistent element, wherein the first persistent element is displayed in an enhanced visual state relative to a reduced visual state of other persistent elements within the feature game state of the graphical game interface to visually distinguish an active game feature from the base game and any remaining of the one or more game features;

spinning and stopping the plurality of symbol-bearing bonus reels to land symbols from the plurality of symbol-bearing bonus reels in the bonus array;

in response to detecting, within the feature game state, an additional feature-triggering symbol associated with a second of the other persistent elements within the landed symbols, transitioning, by the game-logic circuitry, the second persistent element from the reduced visual state to the enhanced visual state within the feature game state; and in response to detecting the landed symbols in the bonus array includes an award trigger, presenting, by the presentation assembly, an award sequence for the first persistent element to provide an accumulated award indicated by the award indicia of the first persistent element.

2. The method of claim 1, wherein the value-bearing symbol is associated with the first persistent element based on the landed symbols including a feature-trigger symbol associated with the first persistent element.

3. The method of claim 1, wherein the award trigger includes one or more award symbols within the bonus array.

4. The method of claim 1, wherein the at least one persistent element includes a plurality of persistent elements, and wherein each persistent element of the plurality of persistent elements is associated with a respective type of value-bearing symbol, a respective type of feature-triggering symbol, or combinations thereof.

5. The method of claim 4, wherein at least one type of value-bearing symbol or at least one type of feature-trigger symbol is associated with more than one persistent element of the plurality of persistent elements.

6. The method of claim 1, wherein the at least one persistent element comprises the first persistent element and a second persistent element, and wherein the second persistent element is available to accumulate value-bearing symbols within the one or more game features.

7. The method of claim 1, wherein the at least one persistent element comprises the first persistent element and a second persistent element, and wherein the second persistent element is absent from the one or more game features.

8. A gaming system comprising:

a gaming machine comprising a presentation assembly; and game-logic circuitry in communication the presentation assembly, wherein the game-logic circuitry is configured to:

conduct a base game including:

present, via the presentation assembly, a graphical game interface in a base game state including a plurality of symbol-bearing base reels, a base array, and at least one persistent element including a first persistent element with award indicia;

cause the presentation assembly to spin and stop the plurality of symbol-bearing base reels to land symbols from the plurality of symbol-bearing base reels in the base array;

in response to the landed symbols including a value-bearing symbol associated with the first persistent element, accumulate, for the first persistent element, the value-bearing symbol by accessing a stored value for the first persistent element from a memory of the game-logic circuitry, aggregating the award value from the value-bearing symbol with the stored value to create an updated value, storing the updated value in the memory, and updating, via the presentation assembly, the award indicia of the first persistent element at least partially as a function of an award value visually indicated by the value-bearing symbol;

in response to the landed symbols including at least one feature-triggering symbol associated with the first persistent element:

cause the presentation assembly to animate an addition of the feature-triggering symbol to the first persistent element; and randomly determine whether or not to trigger one or more game features associated with the first persistent element; and in response to triggering the one or more game features, implement the one or more game features, including:

animate, via the presentation assembly, the graphical game interface to transition to a feature game state including a plurality of symbol-bearing bonus reels, a bonus array, and the first persistent element, wherein the first persistent element is displayed in an enhanced visual state relative to a reduced visual state of other persistent elements within the feature game state of the graphical game interface to visually distinguish an active game feature from the base game and any remaining of the one or more game features;

cause the presentation assembly to spin and stop the plurality of symbol-bearing bonus reels to land symbols from the plurality of symbol-bearing bonus reels in the bonus array;

in response to detecting, within the feature game state, an additional feature-triggering symbol associated with a second of the other persistent elements within the landed symbols, transition the second persistent element from the reduced visual state to the enhanced visual state within the feature game state; and in response to detecting the landed symbols in the bonus array includes an award trigger, present, via the presentation assembly, an award sequence for the first persistent element to provide an accumulated award indicated by the award indicia of the first persistent element.

9. The gaming system of claim 8, wherein the value-bearing symbol is associated with the first persistent element based on the landed symbols including a feature-trigger symbol associated with the first persistent element.

10. The gaming system of claim 8, wherein the award trigger includes one or more award symbols within the bonus array.

11. The gaming system of claim 8, wherein the at least one persistent element includes a plurality of persistent elements, and wherein each persistent element of the plurality of persistent elements is associated with a respective type of value-bearing symbol, a respective type of feature-triggering symbol, or combinations thereof.

12. The gaming system of claim 8, wherein the logic circuitry is further configured to reset, via the presentation assembly, the award indicia of the first persistent element to a default value in response to the award sequence.

13. The gaming system of claim 8, wherein updating the award indicia of the first persistent element includes aggregating the award value of the value-bearing symbol with a preexisting award value indicated by the award indicia of the first persistent element prior to updating the award indicia.

14. The gaming system of claim 8, wherein the value-bearing symbol is a feature-trigger symbol.

15. A gaming machine comprising:

a presentation assembly; and game-logic circuitry in communication with the presentation assembly, the game-logic circuitry configured to:

conduct a base game including:

present, via the presentation assembly, a graphical game interface in a base game state including a plurality of symbol-bearing base reels, a base array, and at least one persistent element including a first persistent element with award indicia;

cause the presentation assembly to spin and stop the plurality of symbol-bearing base reels to land symbols from the plurality of symbol-bearing base reels in the base array;

in response to the landed symbols including a value-bearing symbol associated with the first persistent element, accumulate, for the first persistent element, the value-bearing symbol by accessing a stored value for the first persistent element from a memory of the game-logic circuitry, aggregating the award value from the value-bearing symbol with the stored value to create an updated value, storing the updated value in the memory, and updating, via the presentation assembly, the award indicia of the first persistent element at least partially as a function of an award value visually indicated by the value-bearing symbol;

in response to the landed symbols including at least one feature-triggering symbol associated with the first persistent element:

cause the presentation assembly to animate an addition of the feature-triggering symbol to the first persistent element; and randomly determine whether or not to trigger one or more game features associated with the first persistent element; and in response to triggering the one or more game features, implement the one or more game features, including:

animate, via the presentation assembly, the graphical game interface to transition to a feature game state including a plurality of symbol-bearing bonus reels, a bonus array, and the first persistent element, wherein the first persistent element is displayed in an enhanced visual state relative to a reduced visual state of other persistent elements within the feature game state of the graphical game interface to visually distinguish an active game feature from the base game and any remaining of the one or more game features;

cause the presentation assembly to spin and stop the plurality of symbol-bearing bonus reels to land symbols from the plurality of symbol-bearing bonus reels in the bonus array;

in response to detecting, within the feature game state, an additional feature-triggering symbol associated with a second of the other persistent elements within the landed symbols, transition the second persistent element from the reduced visual state to the enhanced visual state within the feature game state; and in response to detecting the landed symbols in the bonus array includes an award trigger, present, via the presentation assembly, an award sequence for the first persistent element to provide an accumulated award indicated by the award indicia of the first persistent element.

16. The gaming machine of claim 15, wherein the value-bearing symbol is associated with the first persistent element based on the landed symbols including a feature-trigger symbol associated with the first persistent element.

17. The gaming machine of claim 15, wherein the award trigger includes one or more award symbols within the bonus array.

18. The gaming machine of claim 15, wherein the at least one persistent element comprises the first persistent element and a second persistent element, and wherein the second persistent element is available to accumulate value-bearing symbols within the one or more game features.

19. The gaming machine of claim 15, wherein the logic circuitry is further configured to reset, via the presentation assembly, the award indicia of the first persistent element to a default value in response to the award sequence.

20. The gaming machine of claim 15, wherein the at least one persistent element comprises the first persistent element and a second persistent element, and wherein the second persistent element is absent from the one or more game features.

21. The gaming machine of claim 15, wherein value-bearing symbols detected within the one or more game features are accumulated by the first persistent element.

* * * * *